US 6,690,624 B2

(12) United States Patent
Shimazaki et al.

(10) Patent No.: US 6,690,624 B2
(45) Date of Patent: Feb. 10, 2004

(54) MAGNETIC LENS, MAGNETIC REPRODUCING ELEMENT, REPRODUCING APPARATUS AND REPRODUCING METHOD

(75) Inventors: Katsusuke Shimazaki, Toride (JP); Yoshitane Tsuburaya, Kitasouma-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 26 days.

(21) Appl. No.: 10/188,112

(22) Filed: Jul. 3, 2002

(65) Prior Publication Data

US 2002/0163861 A1 Nov. 7, 2002

Related U.S. Application Data

(62) Division of application No. 09/334,939, filed on Jun. 17, 1999, now Pat. No. 6,438,073.

(30) Foreign Application Priority Data

Jun. 18, 1998 (JP) ............................................ 10-171266

(51) Int. Cl.[7] .............................................. G11B 11/00
(52) U.S. Cl. .................................. 369/13.06; 369/13.32
(58) Field of Search ........................... 369/13.05, 13.02, 369/13.08, 13.07, 44.22, 13.22, 116, 288, 13.17, 13.24, 13.14, 13.13, 13.06, 110.02, 112.06, 13.47; 428/694 ML, 694 EC, 694 MM

(56) References Cited

U.S. PATENT DOCUMENTS 4,984,226 A   1/1991   Kobori .................... 369/13.32

6,424,601 B1 * 7/2002 Oonuki et al. ........... 369/13.08
6,556,516 B1 * 4/2003 Shimazaki et al. ...... 369/13.02

FOREIGN PATENT DOCUMENTS

| JP | A-1-143041 | 6/1989 |
| JP | 6-295479   | 10/1994 |
| JP | 8-7350     | 1/1996 |

OTHER PUBLICATIONS

Murakami, Y. et al., "Super Resolution Readout of a Magneto–Optical Disk with an In–Plane Magnetization Layer," Proceeding of Magneto–Optical Recording International Symposium '92, J. Magn. Soc. Jpn., vol. 17, pp. 201–204.

* cited by examiner

Primary Examiner—Ali Neyzari
(74) Attorney, Agent, or Firm—Oliff & Berridge, PLC

(57) ABSTRACT

A magnetic lens has a reproducing layer and a magnetic slit. When the leak magnetic field Hlk of a recording magnetic domain on a recording disk exceeds the coercive force He of the magnetic slit, the magnetization in the magnetic slit is inverted into the same direction as that of the magnetization of the recording magnetic domain. Transition occurs from the in-plane magnetization to the perpendicular magnetization in a magnified area of the reproducing layer in which the temperature exceeds the critical temperature Tcr. The upward magnetization in the magnetic slit is transferred thereto. The magnetization information on the recording magnetic domain is reproduced with amplified signal intensity on the basis of the magneto-optical effect by detecting the reflected light beam of the reproducing light beam from the magnified area. A plurality of minute magnetic domains contained in an object can be detected respectively at a high sensitivity in an independent manner.

34 Claims, 18 Drawing Sheets

MAGNETIC LENS, MAGNETIC REPRODUCING ELEMENT, REPRODUCING APPARATUS AND REPRODUCING METHOD

This is a Division of application Ser. No. 09/334,939 filed Jun. 17, 1999 now U.S. Pat. No. 6,438,073. The entire disclosure of the prior application is hereby incorporated by reference herein in its entirety.

BACKGROUND OF THE INVENTION

1. Field of the Invention

The present invention relates to a magnetic lens which makes it possible to magnify and observe a minute magnetic domain contained in an object. The present invention also relates to a reproducing apparatus and a reproducing method for an information recording medium including a magnetic recording layer. In particular, the present invention relates to a magnetic reproducing element, a reproducing apparatus, and a reproducing method which make it possible to perform reproduction from an extremely minute magnetic domain while amplifying intensity of a reproduced signal.

2. Description of the Related Art

In recent years, the magneto-optical recording medium attracts the attention, which makes it possible to record a large amount of data at a high density and quickly perform recording and reproduction thereon, corresponding to the advance of multimedia. For example, the recording is performed on a magneto-optical recording medium capable of overwrite such that a laser beam is radiated onto the magneto-optical recording medium, and a magnetic field corresponding to input information is applied to a position irradiated with the laser beam. When the reproduction is performed on the magneto-optical recording medium as described above, a laser beam, which is weaker than that used upon the recording, is radiated onto the magneto-optical recording medium. Information is reproduced by detecting a polarization angle of a reflected laser beam depending on the direction of recording magnetization possessed by the returning light beam of the laser beam.

As shown in FIG. 20, a head mechanism, which is used for such a magneto-optical recording and reproducing apparatus, has been hitherto based on the use of an optical head 80 and a magnetic head 81 which are arranged on both sides of a disk recording medium respectively while opposing to one another with respect to the center line. In this arrangement, each of the optical head 80 and the magnetic head 81 has a large size and a large weight. Therefore, the respective heads 80, 81 are supported by a support member 83. A screw rotary shaft 84 is rotated by a driving motor 87, and thus the respective heads 80, 81 are moved over the disk recording medium 130 to record, reproduce, and erase the information. This system involves the following drawback. That is, the volume and the weight of the recording and reproducing apparatus are large, and it is impossible to respond, for example, to the demand for the small size, the light weight, the large capacity, and the high speed access upon recording, reproduction, and erasing which are required for the disk recording medium and for the recording and reproducing apparatus. On the other hand, a magneto-optical head mechanism 20 shown in FIG. 21 is known as a technique to respond to the miniaturization of the recording and reproducing apparatus by integrating the optical head 80 and the magnetic head 81 into one unit. In this mechanism, a driving unit 73 for an objective lens 301 of an optical head system 72, and a magnetic head slider 75 arranged with a magnetic head coil 76 are combined into one unit. A hole 77 is formed through the magnetic head slider 75 for transmitting a convergent light beam 74 of a laser beam 71 radiated from the optical head. The recording and reproducing apparatus based on the use of such a magneto-optical head has a considerably small volume. However, such an apparatus is insufficient to respond, for example, to the demand for the small size, the light weight, the large capacity, and the high speed access upon recording, reproduction, and erasing which are required for the recording and reproducing apparatus.

On the other hand, the magnetic hard disk is capable of rewriting recorded information. The magnetic hard disk is a recording medium having a large storage capacity and having high reliability. Therefore, the magnetic hard disk is practically used, for example, as a memory for the computer. However, the amount of information increases at a high speed, and the development of compact systems advances at a high-speed as well. It has been attempted to achieve recording at a higher density on the magnetic hard disk based on a method to perform reproduction by using the laser beam.

In order to increase the recording density of the magneto-optical recording medium, it is necessary to make the recording magnetic domain to be minute. The magnetic field modulation method is used for the recording on the magneto-optical recording medium, in which a magnetic field having a polarity corresponding to a recording magnetic domain signal is applied to a temperature-raised portion while irradiating the recording medium with a laser beam. This method is capable of overwrite recording, and it has succeeded in high density recording, for example, recording with a shortest mark length of 0.15 $\mu$m. Further, the light modulation recording system is also practically used, in which the recording is performed by radiating a power-modulated laser beam corresponding to a recording signal under a constant applied magnetic field. However, this method involves a problem concerning the resolution of an objective lens included in an optical head to be used when recorded minute recording magnetic domains are subjected to reproduction. The resolution has a limit value which is determined by the wavelength of the laser beam used upon reproduction and the numerical aperture N.A. of the objective lens. Reproduction is not achieved with minute magnetic domains of 0.15 $\mu$m as described above.

For example, as for minute recording magnetic domains or minute concave/convex pits to be subjected to high density recording, a minute mark having a magnetic domain length of 0.15 $\mu$m can be subjected to recording by using, for example, a laser beam having a spot diameter of 1 $\mu$m. However, in the present circumstances, it is impossible to perform reproduction while distinguishing minute magnetic domain signals of 0.15 $\mu$m by using the laser beam having the spot diameter of 1 $\mu$m as described above. An approach has been suggested in order to eliminate the limitation of the reproducing resolution due to the optical spot diameter of the reproducing light beam, i.e., for example, the magnetically induced super resolution technique (MSR) as described, for example, in *Journal of Magnetic Society of Japan*, Vol. 17, Supplemental S1, pp. 201 (1993). This technique utilizes the fact-that the temperature distribution appears on a magnetic film within a reproducing light spot when the magneto-optical recording medium is irradiated with a reproducing light beam, so that a magnetic mask is generated in the spot to reduce the effective spot diameter which contributes to the reproduction of the signal. The use of this technique makes it possible to improve the reproducing resolution without reducing the actual reproducing light spot diameter. However, in this technique, the amount of light, which contributes to the reproduction output, is lowered, and the reproduction C/N is lowered corresponding thereto, because the effective spot diameter is decreased by using the magnetic mask. As a result, it is difficult to obtain sufficient C/N, and hence it is difficult to practically use this technique.

Japanese Patent Application Laid-Open Nos. 1-143041, 6-295479, and 8-7350 disclose a method which uses a magneto-optical recording medium obtained by forming and stacking a magneto-optical recording layer and a recording magnetic domain-reproducing layer for transferring and magnifying recording magnetic domains to perform reproduction. However, in the case of the method described in each of the patent documents, the medium structure of the magneto-optical recording medium is complicated, and the production cost becomes expensive as well. Further, when the recorded magnetic signal is transferred to the reproducing layer, any noise such as leak magnetic field other than the reproducing magnetic signal is simultaneously transferred. As a result, the noise is contained in the magnified reproduced signal obtained from the reproducing layer. Therefore, there is a possibility that C/N of the magnified reproduced signal may be decreased.

SUMMARY OF THE INVENTION

The present invention has been made in order to solve the problems as described above, an object of which is to provide a magnetic reproducing element, a reproducing apparatus, and a reproducing method which make it possible to perform reproduction at high C/N from minute magnetic domains.

Another object of the present invention is to provide a novel element which makes it possible to magnetically magnify and observe minute magnetic domains contained in an object.

According to a first aspect of the present invention, there is provided a magnetic lens for magnifying a minute magnetic domain existing in an object to observe or detect it, the magnetic lens comprising:

a magnetic slit which is filled with a magnetic material and to which the minute magnetic domain is transferred; and a detecting section including a magnetic film having a width larger than the minute magnetic domain at least a part of the magnetic film being magnetically connected to the magnetic slit, wherein:

magnetization information of the minute magnetic domain is detected from the detecting section on the basis of a magneto-optical effect by disposing the magnetic lens close to the object and radiating a light beam onto the magnetic film of the detecting section of the magnetic lens.

The existing optical lens is an element capable of visually magnifying a sample to perform observation. On the other hand, the device (or the element) of the present invention is a novel device capable of magnetically magnifying the minute magnetic domain contained in the object to perform observation. Therefore, the device can be regarded as a magnetic lens which is a concept corresponding to the optical lens. The device is herein referred to as "magnetic lens". Preferably, the object to be subjected to the observation is, for example, a magnetic recording medium and a magneto-optical recording medium on which magnetization information is recorded at a high density. These media have been developed in order that the recording magnetic domain is miniaturized to make it possible to perform high density recording. The magnetic lens of the present invention is extremely effective to detect the magnetization information recorded on such a minute magnetic domain. However, the magnetic lens of the present invention is not limited to the use for such a recording medium. The magnetic lens of the present invention is effective in all of the use or application to detect information containing magnetic characteristics in a minute area. For example, the magnetic lens of the present invention will be also effective to inspect or test integrated circuits such as LSI and microdevices provided with functions relevant to various magnetic characteristics.

When the minute magnetic domain of the object is observed by using the magnetic lens of the present invention, the magnetic lens is allowed to make approach to the object so that the magnetic slit of the magnetic lens is at a distance capable of detecting the leak magnetic field from the minute magnetic domain. In this state, the magnetization information on the minute magnetic domain is transferred to the magnetic slit by the aid of the leak magnetic field from the minute magnetic domain. When the light beam is radiated onto the magnetic film of the detecting section of the magnetic lens, the magnetization, which has been further transferred from the magnetic slit to the magnetic film of the detecting section, is detected in accordance with the magneto-optical effect of the magnetic film. The width (diameter) of the magnetic slit is designed so that it has a size not more than several times that of the minute magnetic domain intended to be observed. Preferably, the width is designed to be smaller than the minute magnetic domain. For example, the width is designed to be not more than 5 $\mu$m, preferably not more than 0.2 $\mu$m. Accordingly, only the magnetization information of a desired magnetic domain can be transferred to the magnetic slit while distinguishing the desired magnetic domain from the other magnetic domains adjacent to the minute magnetic domain intended to be observed. The magnetic film of the detecting section is larger than the width (diameter) of the minute magnetic domain. For example, the magnetic film has an areal size which is not less than twice the width of the minute magnetic domain, for example, several times to several tens times the width of the minute magnetic domain. Therefore, the magnetization information, which has been once transferred to the magnetic slit, is further transferred to the magnetic film having the large areal size as described above. Therefore, the magnetization having the magnetization information is magnified as compared with the minute magnetic domain. The magnetic film having the large areal size can be irradiated with the light beam to detect the magneto-optical effect (Kerr rotation angle) of the magnetic film by the aid of the reflected light beam. The signal intensity, which is obtained in this process depending on the magneto-optical effect, is amplified in accordance with the areal size ratio of the magnetic film with respect to the minute magnetic domain, as compared with the signal intensity obtained when the light beam is directly radiated onto the minute magnetic domain to detect the magneto-optical effect. Therefore, the use of the magnetic lens of the present invention makes it possible to observe the minute magnetic domain with the signal intensity sufficient to distinguish the magnetization information. The magnetic slit may be composed of permalloy having small coercive force.

The magnetic lens of the present invention may further comprise a non-magnetic layer provided between the magnetic slit and the magnetic film, wherein the magnetic slit and the magnetic film are magnetostatically coupled via the non-magnetic layer. The non-magnetic layer may be a reflective layer for reflecting the light beam radiated onto the detecting section. A material, which has higher thermal conductivity than a material for constructing the reflective layer, may be embedded in a portion of the reflective layer opposing to the magnetic slit. By doing so, the heat, which is generated by the light beam in the magnetic slit, is easily transmitted. Thus, the coercive force of the magnetic slit is lowered, making it easier to transfer the minute magnetic domain to the magnetic slit.

In the magnetic lens described above, the magnetic film may be a magnetic film which changes from an in-plane magnetizable film to a perpendicularly magnetizable film at a temperature above a predetermined critical temperature. In this arrangement, the magnetic domain, which has been transferred to the magnetic slit, is transferred to an area in which the temperature exceeds the critical temperature by being heated by irradiation with the light beam.

The magnetic lens may further comprise a reflective layer, and the magnetic slit may be embedded in the reflective layer. When the light beam is radiated, the reflective layer makes it possible to increase the reflected light beam from the magnetic layer.

According to a second aspect of the present invention, there is provided a magnetic reproducing element to be arranged closely to a recording medium, for performing reproduction on the recording medium including a magnetic recording layer recorded with information as a recording magnetic domain, the magnetic reproducing element comprising:

a magnetic transfer section composed of a magnetic material for transferring the recording magnetic domain thereto; and a reproducing section composed of a magnetic material and magnetically connected to the magnetic transfer section, the reproducing section having a width larger than the recording magnetic domain, wherein:

a reproducing light beam is radiated onto the reproducing section when the information is reproduced, and the reproducing light beam is used to reproduce magnetization information transferred from the recording magnetic domain to the reproducing section via the magnetic transfer section.

The magnetic lens of the present invention can be used as a reproducing element for performing reproduction from the recording magnetic domain (minute magnetic domain) on the recording medium provided with the magnetic recording layer. Also in this case, when the reproducing section is irradiated with the light beam, the magnetization information on the recording magnetic domain is transferred via the transfer section to the magnetic film of the reproducing section to give the magnetic domain having the width larger than that of the recording magnetic domain. The transferred magnetization information is detected by the aid of the reproducing light beam on the basis of the magneto-optical effect. The transfer section may have a size smaller than that of the recording magnetic domain.

According to a third aspect of the present invention, there is provided a reproducing apparatus for performing reproduction on a recording medium including a magnetic recording layer recorded with information as a recording magnetic domain, the reproducing apparatus comprising:

an optical head for radiating a reproducing light beam onto the recording medium; and a magnetic head for being arranged closely to the recording medium, wherein:

the magnetic head includes a magnetic transfer section composed of a magnetic material for transferring the recording magnetic domain thereto, and a reproducing section composed of a magnetic material and magnetically connected to the magnetic transfer section, the reproducing section having a width larger than the recording magnetic domain; and the reproducing light beam is radiated from the optical head onto the reproducing section of the magnetic head when the information is reproduced, and the reproducing light beam is used to reproduce magnetization information transferred from the recording magnetic domain to the reproducing section via the magnetic transfer section.

The magnetic lens of the present invention can be applied to the magnetic head to be used for the reproducing apparatus for performing reproduction on the recording medium, for example, the magneto-optical recording medium or the magnetic recording medium provided with the magnetic recording layer in which the information is recorded as the recording magnetic domain. The reproducing apparatus of the present invention makes it possible to detect the minute magnetic domain recorded at a high density, with the increased signal intensity. Therefore, it is unnecessary for the magneto-optical recording medium to have the magnifying function composed of the complicated stacked structure as disclosed in Japanese Patent Application Laid-Open Nos. 6-295479 and 8-7350. Accordingly, it is possible to simplify the structure of the magneto-optical recording medium. Thus, it is possible to provide the magneto-optical recording medium at low cost, capable of performing the high density recording and reproduction thereon.

In the reproducing apparatus described above, the magnetic head is arranged closely to the recording medium so that the leak magnetic field from the recording magnetic domain may be detected to transfer the magnetization information on the recording magnetic domain to the transfer section. The reproducing apparatus of the present invention may further comprise a slider which floats over a surface of the recording medium in accordance with an aerodynamic action. In this arrangement, the magnetic head may be provided in a through-hole formed in the slider. A light-transmitting section may be formed in the slider. The tracking can be performed for the recording medium by using the light beam passed through the light-transmitting section. The light-transmitting section may be a through-hole, or it may be installed with a light-transmissive material, for example, a material such as GGG. A magnetic coil for applying a magnetic field to the recording medium may be provided in the slider. Further, there may be provided a first arm for supporting the optical head, and a second arm for floating and supporting the slider over the surface of the recording medium. The second arm may be joined to the first arm.

According to a fourth aspect of the present invention, there is provided a reproducing method for performing reproduction on a recording medium including a magnetic recording layer recorded with information as a recording magnetic domain, the reproducing method comprising the steps of:

providing a magnetic reproducing element comprising a magnetic transfer section composed of a magnetic material for transferring the recording magnetic domain thereto, and a reproducing section composed of a magnetic material and magnetically connected to the magnetic transfer section, the reproducing section having a width larger than the recording magnetic domain;

arranging, upon the reproduction of the information, the magnetic reproducing element closely to the recording medium so that magnetization information on the recording magnetic domain is transferred to the magnetic transfer section of the magnetic reproducing element by the aid of a leak magnetic field from the recording magnetic domain in the recording medium; and radiating a reproducing light beam onto the reproducing section of the magnetic reproducing element to reproduce the magnetization information transferred from the recording magnetic domain to the reproducing section via the magnetic transfer section on the basis of a magneto-optical effect of a magnetic layer.

In the case of the conventional reproducing method for the magneto-optical recording medium, the magneto-optical effect of the magneto-optical recording layer has been detected by using the reproducing light beam by irradiating the magneto-optical recording medium with the light beam. However, in the novel reproducing method of the present invention, it is unnecessary to radiate the light beam onto the magneto-optical recording medium. In the method of the present invention, the recording magnetic domain of the recording medium is transferred to the magnetic transfer section of the magnetic reproducing element by utilizing the leak magnetic field. The magnetic domain (magnetization information), which has been transferred to the transfer section, is further transferred to the magnetic film of the detecting section having a large areal size. The magnetic domain transferred to the magnetic film is irradiated with the light beam, and the magneto-optical effect of the magnetic film is detected from the reflected light beam therefrom. Thus, the magnetization information contained in the minute magnetic domain in the recording medium can be reproduced with sufficient signal intensity. The reproducing light beam may be a continuous light beam or a pulse light beam. Further, a reproducing magnetic field may be applied when the information is reproduced in order to facilitate the transfer of the magnetization information to the transfer section and the magnification of the magnetic domain in the detecting section.

In the reproducing apparatus and the reproducing method according to the present invention, the recording medium may be a magneto-optical recording medium comprising at least a magneto-optical recording layer as the magnetic recording layer and a substrate, wherein the recording medium is arranged so that the magneto-optical recording layer is disposed nearer to the magnetic reproducing element than the substrate. In order to detect the leak magnetic field of the magneto-optical recording layer, it is necessary that the magnetic transfer section approaches the magneto-optical recording layer as closely as possible. Therefore, the arrangement as described above is preferred.

DESCRIPTION OF THE PREFERRED EMBODIMENTS

Embodiments and examples of the reproducing apparatus of the present invention will be explained with reference to the drawings.

First Embodiment

Figure 1:
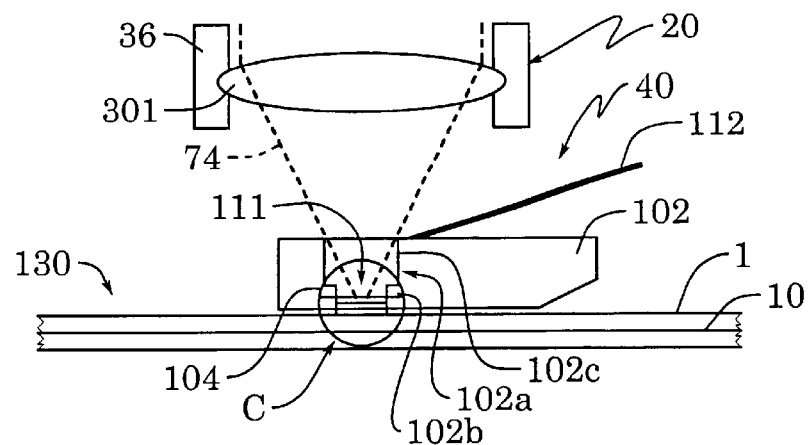
FIG. 1 schematically shows a structure of a magnetic lens 111 incorporated in a recording and reproducing apparatus of the present invention.
Figure 19:
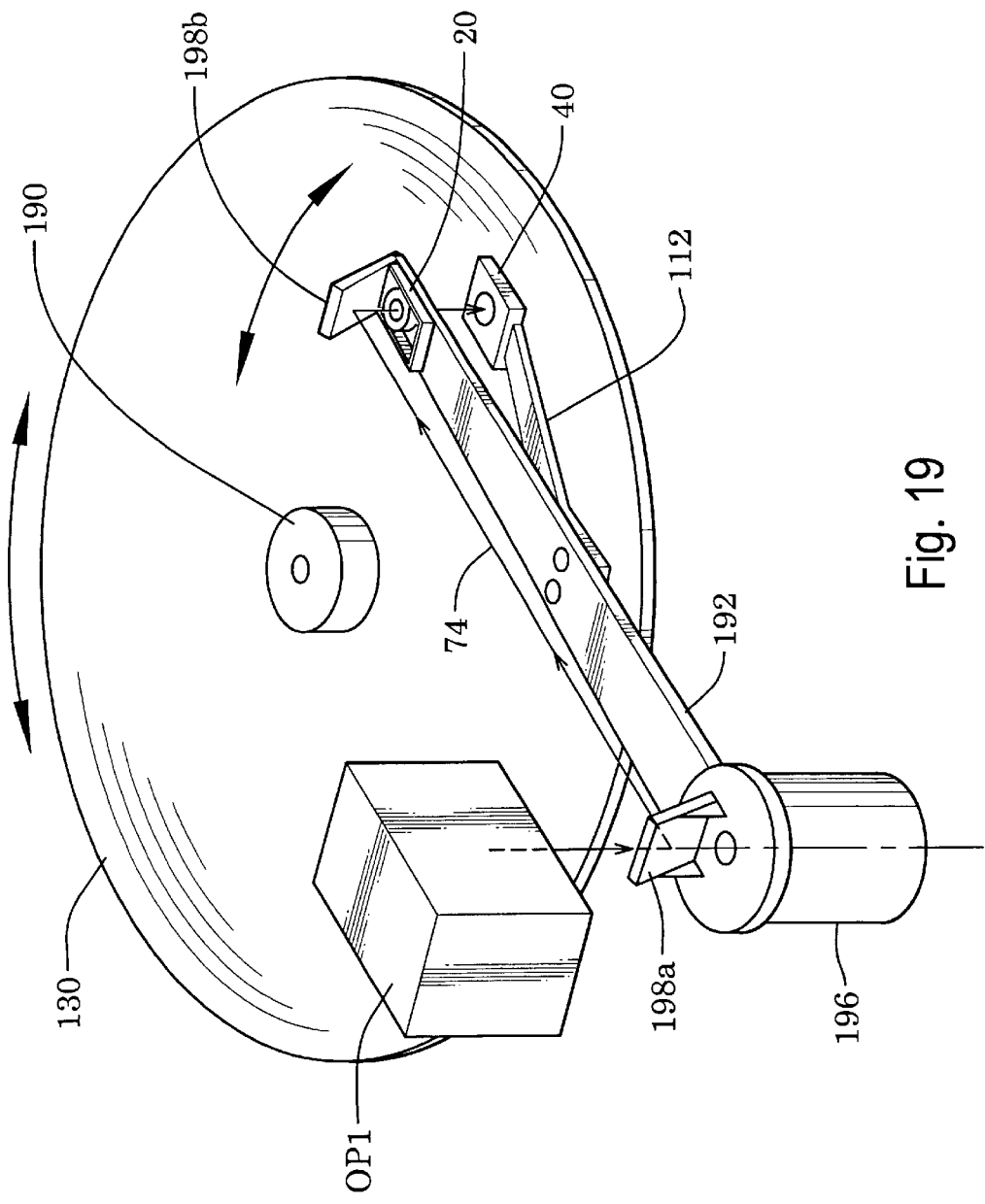
FIG. 19 shows a schematic perspective view illustrating a recording and reproducing apparatus according to the present invention.
Figure 20:
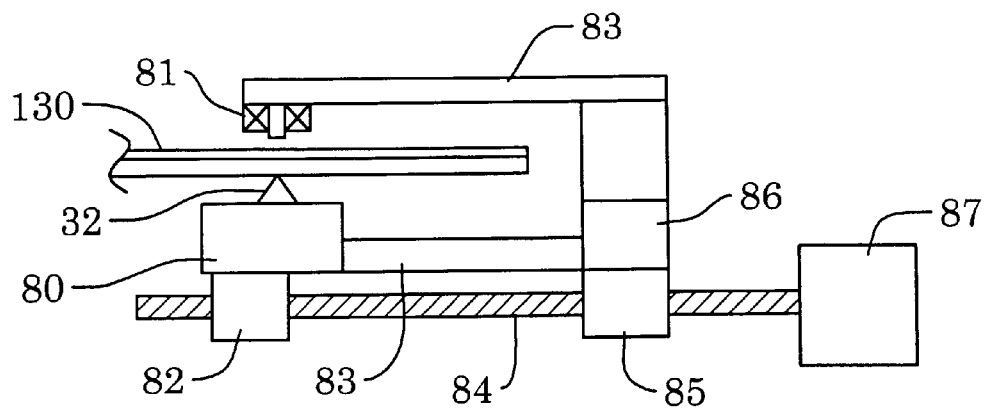
FIG. 20 schematically shows a conventional recording and reproducing apparatus, illustrating a situation in which an optical head and a magnetic head are arranged respectively at positions opposing to one another with a recording medium interposed therebetween.
Figure 21:
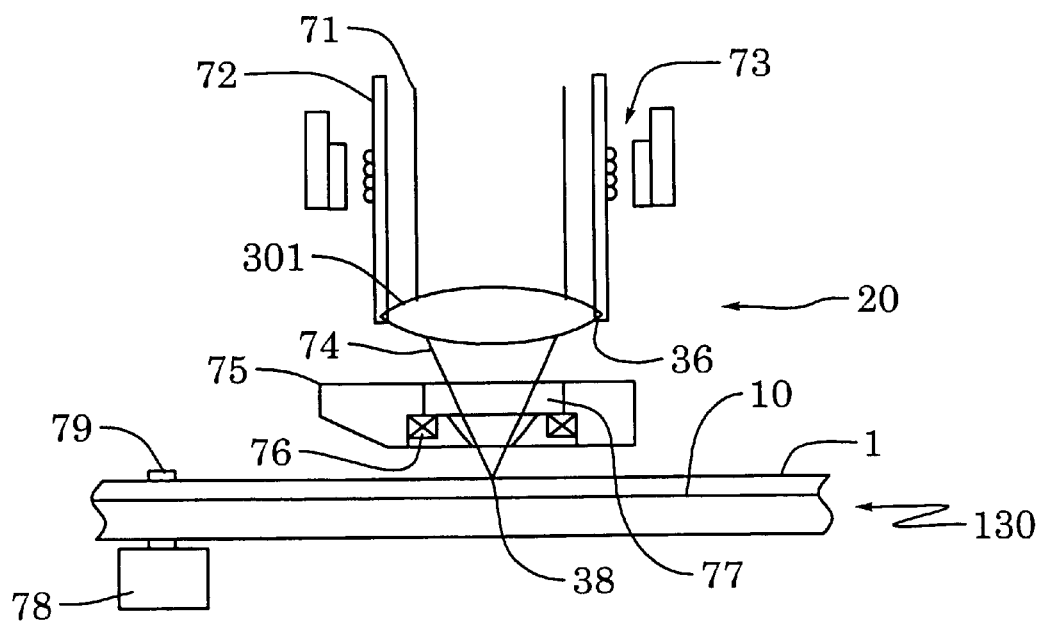
FIG. 21 shows a schematic sectional view illustrating a conventional magneto-optical head mechanism.

FIGS. 19 and 1 show an overview of a reproducing apparatus according to an embodiment of the present invention and a magnified view illustrating components disposed in the vicinity of a magnetic head.

With reference to FIG. 19, the reproducing apparatus 100 principally comprises a disk rotary shaft 190 for rotating a magneto-optical disk 130, a magnetic head 40, an optical system OP1 for accommodating a laser light source as described later on, and an optical head 20 for irradiating the magnetic head 40 with a reproducing light beam radiated from the optical system OP1. The optical head 20 is supported by a first arm 192. The first arm 192 is movable in the radial direction of the magneto-optical disk 130 about the center of the arm rotary shaft 196. The magnetic head 40 is supported so that it floats over the magneto-optical disk 130 by the aid of a first end of the second arm 112. As shown in FIG. 19, a second end of the second arm 112 is joined to a central portion on the back surface of the first arm 192.

Polarizing mirrors 198a, 198b are installed on the arm rotary shaft 196 and the optical head 20 respectively. The reproducing light beam 74, which is radiated from the optical system OP1, is polarized by the mirrors 198a, 198b, and it travels toward the magnetic head 40.

With reference to FIG. 1, the magnetic head 40 includes an air slider 102. The air slider 102 is supported by the second arm (suspension) 112 coupled to the optical head 20 so that it floats over the magneto-optical recording disk 130. A through-hole 102a, which penetrates through the air slider 102 in the vertical direction, is formed in the vicinity of the first end (left side in the drawing) of the air slider 102. The through-hole 102a comprises a small diameter section 102b which has its smaller diameter disposed in the vicinity of the bottom of the air slider 102, and a large diameter section 102c which is disposed over the small diameter section 102b and which is formed coaxially with the small diameter section 102b. An annular magnetic coil 104 described later on is fitted to the outer circumference in the vicinity of the bottom of the large diameter section 102c. A columnar magnetic lens (also referred to as "magnetic magnifying element" or "magnetic reproducing element") is fitted to the small diameter section 102b. The bottom of the magnetic lens 111 forms a part of the bottom of the air slider 102. The structure of the magnetic lens 111 will be described later on.

The optical head 20 includes a holder 36. A collective lens 301 is installed to the lower end of the holder to focus the reproducing light beam 74 on the magnetic lens 111.

Explanation will be made below for the outline of the principle of reproduction based on the use of the optical head 20 and the magnetic head 40. When the magneto-optical disk 130 is rotated by the disk rotary shaft 190, the air flow enters the space between the magnetic head 40 and the magneto-optical disk 130. The magnetic head 40 is floated in accordance with the Bernoulli's theorem at a spacing distance of several nm to several tens $\mu$m over the surface of the magneto-optical disk 130. The reproducing light beam 74 is focused by the objective lens 301 in a form of spot on the magnetic lens 111. The area of the magnetic lens 111 in the spot is heated. As described later on, the magnetic domain, which is subjected to recording in the recording layer of the magneto-optical disk 130, is transferred to the magnetic lens 111 in accordance with the leak magnetic field from the recording magnetic domain of the recording layer. The magnetic domain is magnified up to a range of the high temperature portion of the reproducing light spot focused on the magnetic lens 111. The Kerr rotation angle of the magnified magnetic domain is detected from the reflected light beam of the reproducing light beam obtained from the magnetic lens 111, and thus the information is reproduced.

Figure 17:
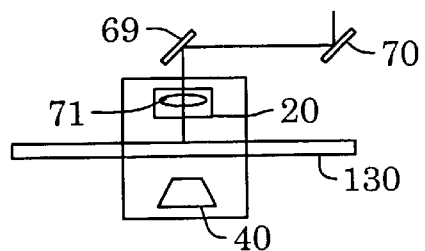
FIG. 17 shows an example in which a magnetic head is arranged at a position opposing to an optical head with a magneto-optical disk intervening therebetween, concerning the movable optical system shown in FIG. 16.

The magnetic coil 104, which is installed in the magnetic head 40, can be used when the magnetic field is applied during the recording of information. The magnetic coil 104 may be used during the reproduction of information as well, if necessary. Alternatively, the magnetic coil 104 may be incorporated into the magnetic head arranged at a position opposing the optical head with the magneto-optical disk 130 interposed therebetween as shown in FIG. 17, in place of the installation to the inside of the air slider 102. Further alternatively, a solid immersion lens may be used as the objective lens 301. When the solid immersion lens is used, then minute recording magnetic domains can be formed on the magneto-optical disk 130 upon the recording, and it is possible to improve the resolution upon the reproduction.

Figure 15A:
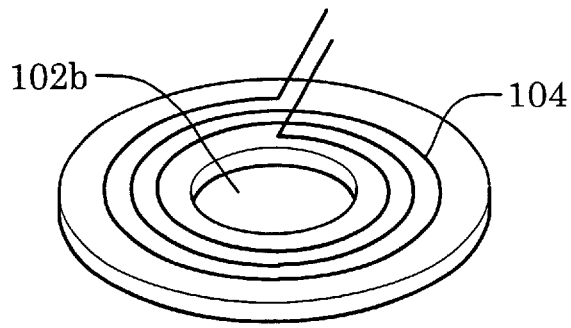
FIG. 15A shows a shape of a magnetic coil installed in a magnetic head, illustrating an annular coil with its small diameter section formed to be circular.
Figure 15B:
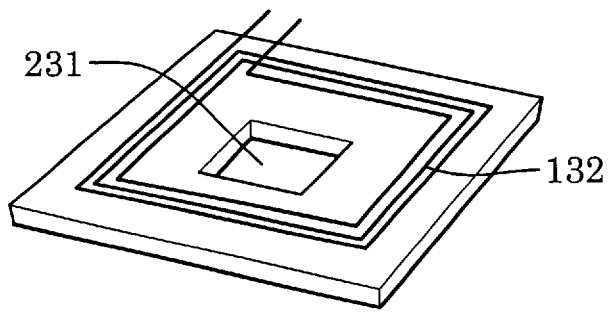
FIG. 15b illustrates a square coil with its small diameter section formed to be square.
Figure 15C:
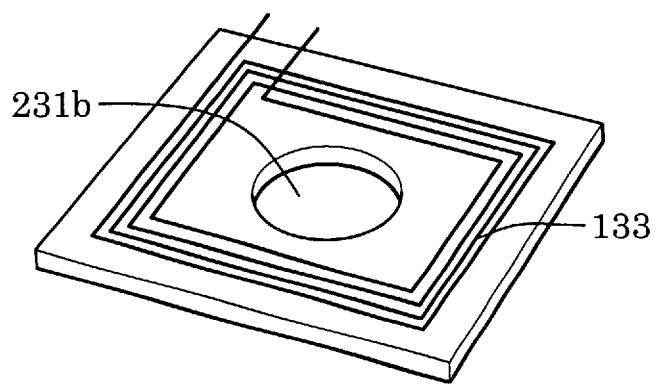
FIG. 15c illustrates a square coil with its small diameter section formed to be circular.
Figure 15D:
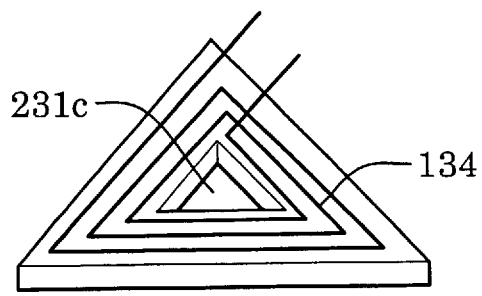
FIG. 15D illustrates a triangular coil with its small diameter section formed to be triangular.

An annular coil 131 as shown in FIG. 15A is used as the magnetic coil 104 described above. However, it is possible to use magnetic coils 132 to 134 as shown in FIGS. 15B, 15C, and 15D. In this arrangement, a hole having a shape indicated by 231a to 231c may be provided in place of the small diameter section 102b.

Figure 2:
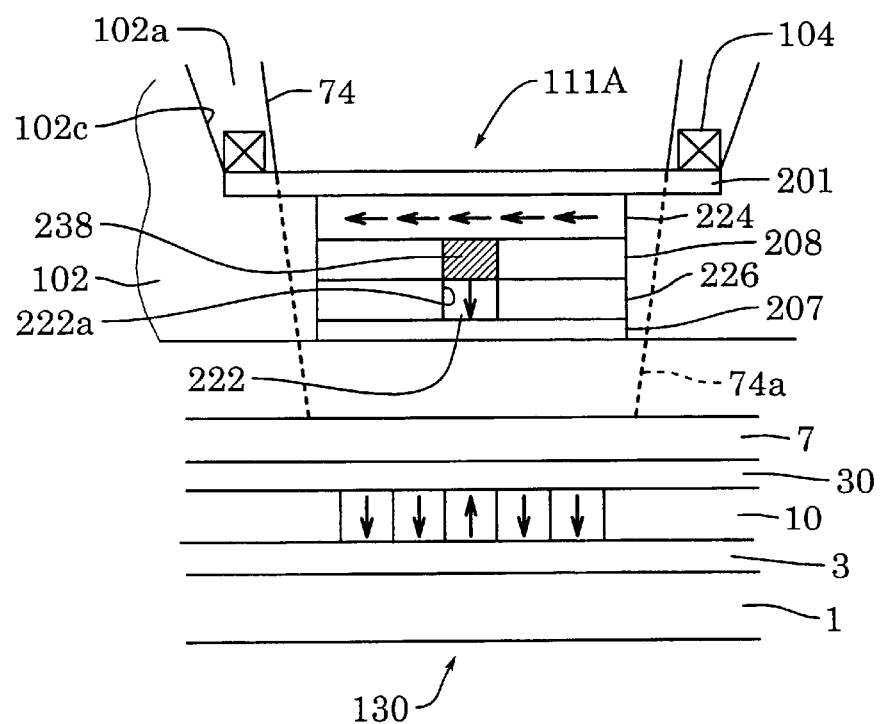
FIG. 2 shows a magnified sectional view illustrating a first embodiment of the magnetic lens of the present invention.

Details of the structure of the magnetic lens will be explained below on the basis of various embodiments with reference to the drawings. FIG. 2 shows a magnified sectional view illustrating a magnetic lens according to the first embodiment. The magnetic lens 111A of this embodiment is fitted to the small diameter section 102b of the through-hole 102a of the slider 102 as described above. The magnetic lens 111A has a stacked structure formed by stacking, in an order of those disposed nearer to the magnetic coil 104, on a GGG (gadolinium-gallium-garnet) substrate 201 having a thickness of 100 $\mu$m, a reproducing layer 224 composed of GdTbFeCo alloy having a thickness of 2.0 $\mu$m, a thermal conductive reflective film 208 composed of Al having a thickness of 0.6 $\mu$m, a GGG layer 226 having a thickness of 1.1 $\mu$m, and a transparent protective film 207 composed of ultraviolet-curable resin. The GGG substrate 201, which is disposed at the uppermost layer, has approximately the same outer diameter as that of the large diameter section 102c of the through-hole 102a, and it is connected with the bottom of the large diameter section 102c. The GGG substrate 201 is light-transmissive with respect to the reproducing light beam, for example, a light beam having a wavelength of 410 nm. The reproducing layer 224 is a magnetic film which causes transition from an in-plane magnetizable film to a perpendicularly magnetizable film at a critical temperature Tcr (=about 150° C.). Therefore, when the reproducing layer 224 is heated by being irradiated with the reproducing light beam 74, it exhibits the perpendicular magnetization in an area exceeding the critical temperature Tcr. The thermal conductive reflective film 208 composed of Al is principally provided in order that the amount of reflected light from the reproducing layer 224 (or the reproducing light beam 74 transmitted through the reproducing layer 224) is increased, and the heat, which is generated in the GGG film 201, the reproducing layer 224, and the reflective film 208 by being irradiated with the reproducing light beam 74, is transmitted to the GGG film 226 disposed thereunder. Silver is embedded in a central portion of the reflective film 208 to make penetration in the thickness direction to form a thermal conductive section 238 as described later on. A slit-shaped opening 222a is formed at a central portion of the GGG layer 226 formed under the reflective film 208. The interior of the opening 222a is filled with Bi-substituted magnetic garnet. Thus, a magnetic slit 222 is formed. The width (diameter) of the magnetic slit 222 is approximately the same as the width (diameter) of the thermal conductive section 238 described above, and it is approximately the same as the size (diameter) of the minimum recording magnetic domain of the magneto-optical disk as described later on. In this embodiment, the width (diameter) of the magnetic slit 222 was 0.1 μm. In this embodiment, the shape of the surface of the magnetic slit 222 on the side opposing to the medium, i.e., the cross-sectional shape in the in-plane direction was circular. However, the shape may be an arbitrary configuration, and it is preferably rectangular or circular. Further, as shown in a lower part of FIG. 3, it is preferable that the ratio between the length "b" in the film thickness direction and the width (diameter) "a" of the magnetic slit 222 (b/a) is not less than 1.

The magneto-optical disk 130 is a magneto-optical disk of the first surface type in which the reproducing light beam comes from the side opposite to the substrate. The magneto-optical disk 130 comprises, as referred to from those depicted in an upper part of the drawing, a protective film 7 composed of AlTi alloy, a dielectric film 30 composed of $Si_3N_4$ compound, a magneto-optical recording film 10 composed of $Tb_{21}Fe_{66}Co_{13}$ alloy, a dielectric film 3 composed of $Si_3N_4$ compound, and a polycarbonate substrate 1 including a preformat pattern formed on its surface, the components being stacked in this order.

Figure 3:
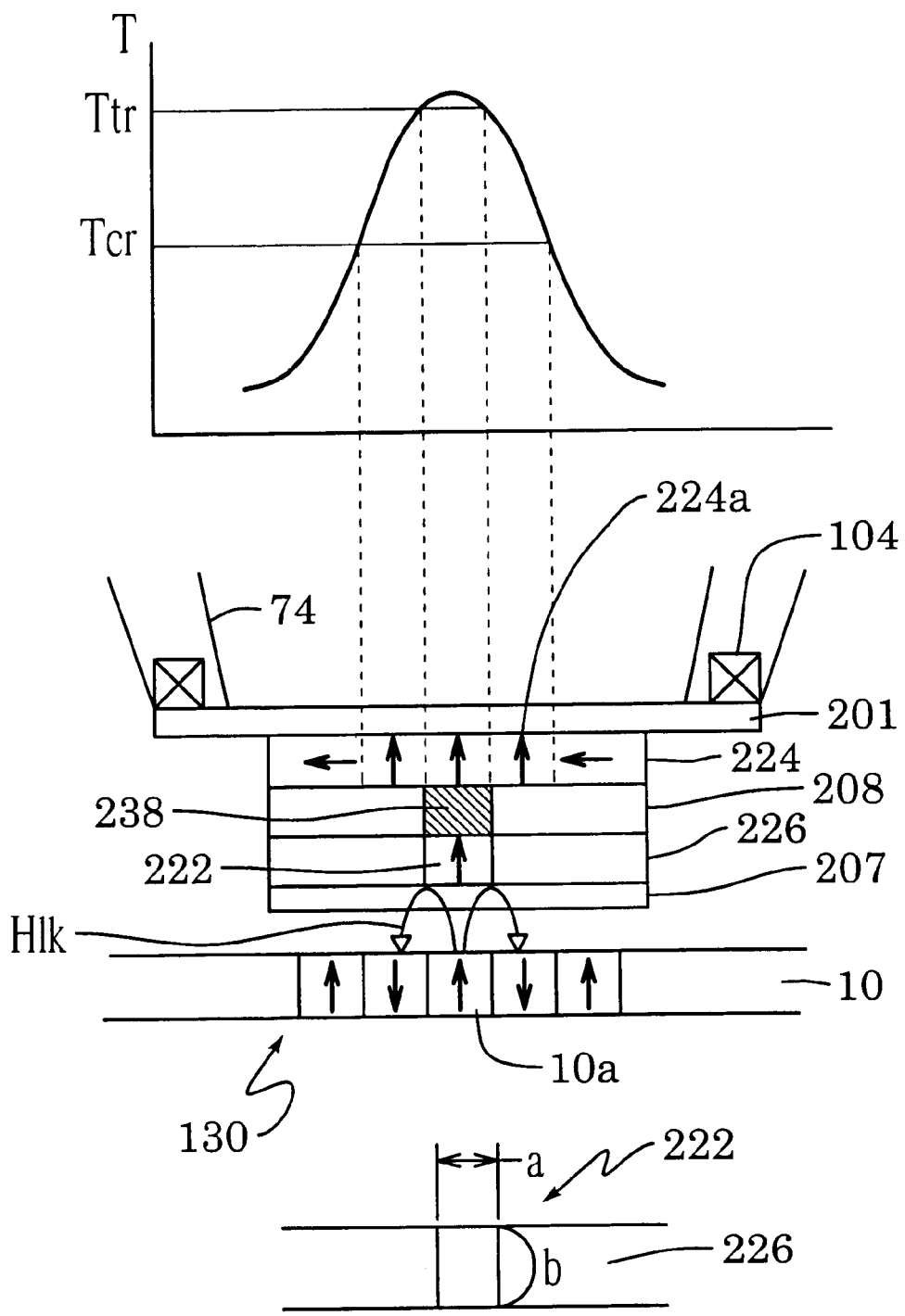
FIG. 3 illustrates the principle of a reproducing method on a magneto-optical disk based on the use of a magnetic lens 111A according to the first embodiment.

The principle of the reproducing method on the magneto-optical disk 130 based on the use of the magnetic lens 111A having the structure shown in FIG. 2 will be explained with reference to FIG. 3. In FIG. 3, the layers other than the recording layer 10 of the magneto-optical disk 130 are omitted from the illustration for convenience of explanation. When the reproducing light beam 74 as the laser beam is radiated onto the magnetic lens 111A, the magnetic lens 111A is heated to give a temperature distribution corresponding to the distribution of the light intensity (Gaussian distribution) of the laser beam as conceptually shown in an upper part of FIG. 3. The center of the light spot has the highest temperature in accordance with the Gaussian distribution. Therefore, the central portion of the magnetic lens 111A has the highest temperature. The reproducing light beam 74 permeates into the magnetic lens 111A to heat the magnetic slit 222 in the GGG layer 226. The heat, which is generated in the reflective layer 208 and the reproducing layer 224, is transmitted to the magnetic slit 222 via the thermal conductive section 238 made of silver disposed just thereunder, facilitating the heating of the magnetic slit 222. As a result of the heating of the magnetic slit 222 as described above, the coercive force Hc of the magnetic material for constructing the magnetic slit 222 (hereinafter simply referred to as "coercive force Hc of the magnetic slit") is lowered. On the other hand, the leak magnetic field Hlk is generated in the upward direction from the recording magnetic domain 10a of the recording layer 10 of the magneto-optical disk 130 disposed just under the magnetic slit 222. When the leak magnetic field Hlk exceeds the coercive force Hc of the magnetic slit 222 (Hc<Hlk), the magnetization in the magnetic slit 222 is directed in the same direction as that of the magnetization of the recording magnetic domain 10a (in this case, the magnetization is inverted). That is, when the condition of Hc<Hlk is satisfied, the recording magnetic domain 10a (or the magnetization information thereof) of the magneto-optical disk 130 is magnetically transferred to the magnetic slit 222. The temperature of the magnetic slit, which is obtained when Hc<Hlk is satisfied, is about 50° C. to 100° C. in this embodiment. On the other hand, the temperature Ttr of the magnetic slit 222 heated by the reproducing light beam 74 is determined by the width of the magnetic slit 222 and the laser beam intensity on the basis of the temperature distribution shown in the drawing. In this embodiment, there is given Ttr=about 180 to 200° C. Therefore, the magnetic slit 222 arrives at the temperature which satisfies Hc<Hlk as a result of being irradiated with the reproducing light beam. Accordingly, the magnetic transfer easily occurs to the magnetic slit 222 in accordance with the leak magnetic field Hlk from the recording magnetic domain 10a.

As described above, the reproducing layer 224 causes transition from the in-plane magnetization to the perpendicular magnetization when the temperature exceeds the critical temperature Tcr. In this embodiment, as illustrated in the temperature distribution shown in the drawing, the critical temperature Tcr of the reproducing layer 224 is set to be lower than the temperature Ttr (Tcr<Ttr). Therefore, the magnetization of the reproducing layer 224 rotates in the vertical direction over an area wider than the magnetic slit 222. During this process, the upward magnetization of the magnetic slit 222 is transferred to the central portion of the reproducing layer 224 by the aid of the leak magnetic field of the magnetization in the vertical direction of the magnetic slit 222 subjected to the magnetic transfer, i.e., in accordance with the magnetostatic coupling. As shown in FIG. 3, the upward magnetization is magnified to the area exceeding the critical temperature Tcr in accordance with the exchange coupling force in the reproducing layer to form a magnetic domain-magnified area 224a. A reproduced signal is now obtained by detecting the reflected light beam of the reproducing light beam 74 from the magnetic domain-magnified area 224a. The magnitude of the reproduced signal is proportional to the size of the area of the upward magnetization. Therefore, the reproduced signal intensity can be amplified to such an extent that the recording magnetic domain 10a is magnified up to the magnified area 224a. Therefore, even when the information is recorded on the extremely minute magnetic domain 10 of the recording layer of the magneto-optical disk 130, the recorded information can be read with the good reproduced signal intensity by transferring and magnifying the magnetization information by the aid of the magnetic lens 111A. The element 111 of the present invention is referred to as the magnetic lens because of the reason as described above.

The laser beam radiated during the reproduction as described above is the continuous light beam. However, it is allowable to use a pulse light beam. By doing so, the magnetic lens 111A is prevented from excessive heating. A reproducing magnetic field may be applied in the recording direction (upward direction in the drawing) during the reproduction by using the magnetic coil 104 to facilitate the transfer of the recording magnetic domain 10a to the magnetic slit 222 and the magnification of the magnetic domain in the reproducing layer 224. The reproducing magnetic field may be a continuous magnetic field or a pulse magnetic field (alternating magnetic field).

Those usable, in addition to GGG, as the material for the transparent substrate 201 of the magnetic lens 111 include, for example, polycarbonate resin and glass. Those usable for the reproducing layer 224 include, for example, PtCo alloy, CoCr alloy, CoCrTa alloy, CoNiCr alloy, transparent ferrite, magnetic garnet such as Bi-substituted type magnetic garnet, yttrium-iron garnet, and rare earth-iron garnet, TbFeCoCr alloy, GdFeCo alloy (for example, $Gd_{25}Fe_{56}Co_{19}$ alloy), GdFeCoCr, GdTbFeCo alloy, TbFeCo alloy, DyFeCo alloy, and NdFeCo alloy. As a result of the investigation on the temperature dependency of θKR/θKS (θKR: residual Kerr rotation angle, θKS: saturated Kerr rotation angle) determined from the hysteresis loop of the Kerr effect obtained when the external magnetic field is applied in the direction perpendicular to the film surface of the reproducing layer 224, it has been revealed that an amorphous alloy of rare earth and transition metal is most preferred as the material for the auxiliary magnetic film, including, for example, GdFeCo, GdFe, GdTbFeCo, and GdDyFeCo. A material having a high magnetic permeability is preferably used for the magnetic material for the magnetic slit 222. For example, it is possible to use permalloy, ferrite, supermalloy (for example, $Ni_{79}Fe_{15.5}Mo_{5.0}Mn_{0.5}$ (wt %)), and sendust (for example, $Fe_{87.7}Si_{6.9}Al_{5.4}$). Other than the above, it is also possible to use, for example, PtCo alloy, CoCr alloy, CoCrTa alloy, CoNiCr alloy, transparent ferrite, and magnetic garnet such as Bi-substituted type magnetic garnet, yttrium-iron garnet, and rare earth-iron garnet. Those usable for the thermal conductive reflective film 208 include, for example, metal such as Al, Ag, Au, Ti, Ta, and Mo, AlTi alloy, $Ta_2O_5$ compound, and $Al_2O_3$ compound.

The reproducing layer 224, the reflective layer 208, the GGG layers 226, 201, and the transparent layer 207 can be formed, for example, in accordance with the dry process such as the continuous sputtering based on the use of the magnetron sputtering apparatus. A variety of known methods can be used to form the thermal conductive section 238 made of silver in the reflective film 208. For example, the thermal conductive section 238 can be formed by using the lithography as follows. At first, Ar ion is allowed to collide against the film of Al to form a hole of about 0.1 μm by means of etching. Subsequently, the silver film is deposited, for example, by means of sputtering on the Al film formed with the hole. The hole is filled with silver in accordance with this operation. Subsequently, the Al film is coated with a resist film. The resist film is subjected to ion beam etching to remove the silver from those other than the portion of the hole and the resist film. Accordingly, the structure is formed, in which only the hole portion of the Al film is filled with silver. The magnetic slit 111, in which the Bi-substituted magnetic garnet is charged in the GGG layer 226, can be formed by using a method similar to the method described above.

In this embodiment, the following condition was used to record and reproduce information on the magneto-optical disk 130. A test signal was previously recorded on the data-recording area of the magneto-optical disk 130 by using the light pulse magnetic field modulation system to perform the recording by applying the magnetic field from the magnetic coil modulated in accordance with the recording signal while radiating the laser beam in a pulse form at a constant cycle. The duty ratio of the recording light pulse was 50%. The test signal was given so that recording marks of various recording mark lengths were formed. During the reproduction, the applied magnetic field from the magnetic coil 104 was zero, and the recording marks of the various lengths were subjected to the reproduction to measure the reproduction C/N ratio (C: carrier level, N: noise level) with a numerical aperture of the objective lens NA=0.55 by using the pickup of, for example, laser beam wavelengths of 340, 410, 640, and 780 nm at a linear velocity of 7.5 m/sec with a reproducing power of 2.5 mW. It has been revealed for the magneto-optical disk 130 according to the embodiment of the present invention that the recording can be performed in a range in which the recording mark length is not less than 0.07 μm and not more than 1.5 μm, and the remarkably high reproduction C/N can be obtained even when the recording mark length is not less than 0.07 μm.

In the present invention, the magnetization information on the magneto-optical disk 130 is reproduced by transferring the recording magnetic domain to the magnetic slit of the magnetic lens. That is, in the present invention, the information is not reproduced such that the reproducing light beam is directly radiated onto the magneto-optical disk 130 to obtain the reflected light beam therefrom in order to reproduce the information. Instead, the information is reproduced by detecting the leak magnetic field from the magnetic domain in the recording layer of the magneto-optical disk 130 by using the magnetic lens 111A. Therefore, upon the reproduction, there is no relation to the magnitude of the reflected light beam of the reproducing light beam from the recording layer and the magnitude of the Kerr effect. The present invention is advantageous in that the magneto-optical disk is easily designed.

Any magneto-optical disk other than the magneto-optical disk 130 shown in FIG. 2, which has an arbitrary structure and which is made of an arbitrary material, can be used as the magneto-optical disk. For example, a transparent resin material such as amorphous polyolefine other than polycarbonate can be used for the transparent substrate 1 of the magneto-optical disk. It is also allowable to use a substrate comprising a transparent resin film such as a ultraviolet-curable resin transferred with a desired preformat pattern allowed to make tight contact with one surface of a glass plate formed to have a desired configuration. An arbitrary material other than silicon nitride may be selected and used for the dielectric layer 3. Those selectively usable for the protective film 7 and the non-magnetic layer 30 include, for example, glass, quartz, mica, diamond-like crystal carbon, silicon nitride ($Si_3N_4$), tantalum oxide ($Ta_2O_3$, $TaO_2$, $Ta_2O_{45}$), silicon oxide ($SiO_2$), aluminum oxide ($Al_2O_3$), and aluminum nitride (AlN). The magneto-optical recording film 10 is a perpendicularly magnetizable film which exhibits the perpendicular magnetic anisotropy at a temperature not less than the room temperature, for which it is most preferable to use amorphous alloy composed of rare earth and transition metal such as TbFeCo, DyFeCo, and TbDyFeCo. However, it is also possible to use other known magneto-optical recording materials such as an alternately stacked material of Co film and a magnetic material of garnet oxide. It is also allowable to add a reflective layer composed of a metal thin film such as Al and AlTi alloy.

When the information is recorded and reproduced by using the magnetic head of the present invention, it is necessary to perform the tracking in order to position the magnetic head and the optical head at desired positions over the magneto-optical disk 130. In order to respond to this demand, for example, with reference to FIG. 2, the side wall portion of the small diameter section 102b disposed under the large diameter section 102c of the slider 102 is formed by using a light-transmissive material such as GGG. By doing so, a part of the reproducing light beam 74 can be used as the tracking light beam 74a to irradiate the magneto-optical disk 130 therewith as shown by broken lines in FIG. 2. The tracking light beam 74a is detected by using an unillustrated detector. Thus, an obtained detection signal can be used to control the positions of the magnetic head and the optical head with respect to the magneto-optical disk 130. Alternatively, a through-hole may be formed at an area through which the tracking light beam 74a is transmitted so that the reproducing light beam passes therethrough. Further alternatively, the reproducing light beam 74 may be divided by using an optical element such as a beam splitter to obtain a tracking light beam passing through an optical path different from that for the reproducing light beam 74 so that the magneto-optical disk 130 is irradiated therewith. Further alternatively, a light beam having a short wavelength such as a wavelength of 400 nm may be used as the reproducing light beam 74, and a light beam having a long wavelength such as 860 nm may be used as the tracking light beam.

Second Embodiment

Figure 4A:
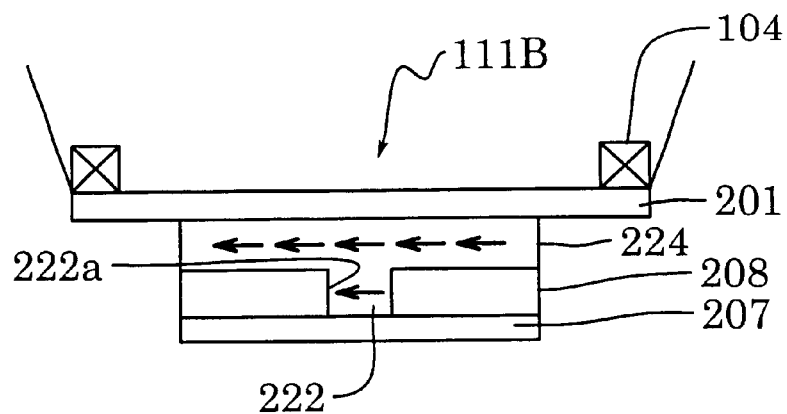
FIG. 4A shows a magnified sectional view illustrating a second embodiment of the magnetic lens of the present invention.

FIG. 4A shows a magnified sectional view illustrating a second embodiment of the magnetic lens. A magnetic lens 111B of this embodiment has a stacked structure formed by stacking, in an order of those disposed nearer to the magnetic coil 104, a polycarbonate substrate 201, a reproducing layer 224 composed of GdFeCo alloy, a thermal conductive reflective film 208 composed of AlTi alloy, and a transparent protective film 207 composed of $SiO_2$.

A slit-shaped opening 222a is formed at a central portion of the thermal conductive reflective film 208 of the magnetic lens 111B. In this embodiment, the interior of the opening 222a was filled with the same material (GdFeCo alloy) as that for the reproducing layer 224 to form a magnetic slit 222. The width (diameter) of the magnetic slit 222 was about 0.1 μm. The reproducing layer 224 of this embodiment can be regarded as a T-type reproducing layer 224 in which the central portion of the reproducing layer 224 in the in-plane direction protrudes downwardly (toward the magneto-optical disk) in an amount corresponding to the magnetic slit 222. The components common to those of the magnetic lens 111A of the first embodiment are designated by the same reference numerals, detailed explanation of which will be omitted.

Figure 4B:
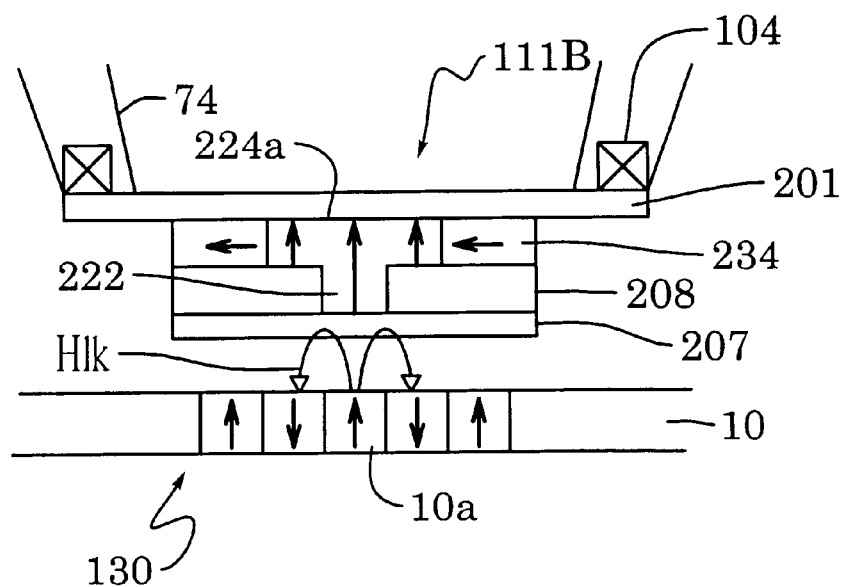
FIG. 4B illustrates the principle of a reproducing method based on the use of the magnetic lens.

Next, explanation will be made with reference to FIG. 4B for the principle of the reproducing method based on the use of the magnetic lens 111B. When the information was reproduced, the same magneto-optical disk 130 as that used in the first embodiment was used. In FIG. 4B, the layers of the magneto-optical disk 130 other than the recording layer 10 are omitted from the illustration for the convenience of explanation.

When the reproducing light beam 74 as the laser beam is radiated onto the magnetic lens 111B, the magnetic lens 111B is heated to give a temperature distribution corresponding to the distribution of the light intensity (Gaussian distribution) of the laser beam. When the reproducing layer 224 is heated by the reproducing light beam 74, the transition occurs from the in-plane magnetization to the perpendicular magnetization in the area of the reproducing layer 224 at which the temperature is not less than the critical temperature Tcr. The reproducing light beam 74, which is radiated onto the magnetic lens 111B, permeates into the magnetic lens 111B, and it heats the magnetic slit 222 in the thermal conductive reflective layer 208. In this embodiment, the magnetic slit 222 is composed of the same material as that for the reproducing layer 224. Accordingly, the magnetization of the magnetic slit 222 also causes the transition from the in-plane magnetization to the perpendicular magnetization in the same manner as in the reproducing layer 224. During this process, the magnetization of the magnetic slit 222 in the vertical direction is directed in the same direction (upward direction) as that of the magnetization of the recording magnetic domain 10a, on account of the influence of the leak magnetic field Hlk from the recording magnetic domain 10a of the recording layer 10 disposed just under the magnetic slit 222. That is, the recording magnetic domain 10a is magnetically transferred to the magnetic slit 222 in accordance with the magnetostatic coupling.

As described above, the magnetic slit 222 is constructed by using the same material as that for the reproducing layer 224. Accordingly, as shown in FIG. 4B, the-magnetization of the reproducing layer 224 is directed in the same direction as that of the upward magnetization of the magnetic slit 222. As shown in FIG. 4B, the area of the reproducing layer 224, in which the temperature exceeds the critical temperature Tcr, has the area (magnified area) 224a which is wider than the width of the magnetic slit 222. The wide area 224a as described above has the upward magnetization in the same direction as that of the magnetic slit 222. This situation can be also recognized such that the recording magnetic domain 10a is magnified and transferred to the reproducing layer 224 via the magnetic slit 222. A reproduced signal is obtained by detecting the reflected light beam of the reproducing light beam 74 from the magnified area 224a. As described above, the magnetic lens 111B of this embodiment also makes it possible to transfer and magnify the magnetization information on the recording layer so that the recorded information is read with the good reproduced signal intensity, in the same manner as in the magnetic lens 111A according to the first embodiment.

Third Embodiment

Figure 5A:
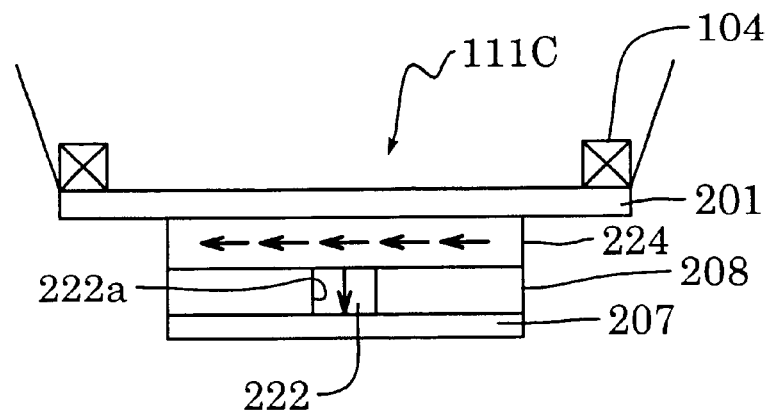
FIG. 5A shows a magnified sectional view illustrating a third embodiment of the magnetic lens of the present invention.

FIG. 5A shows a magnified sectional view illustrating a third embodiment of the magnetic lens. The magnetic lens 111C of this embodiment is a modified embodiment of the magnetic lens 111B according to the second embodiment, and it is constructed in the same manner as in the second embodiment except that the magnetic slit 222 of the magnetic lens 111B of the second embodiment is filled with permalloy ($Ni_{78.5}Fe_{21.5}$) in place of being filled with the same material as that for the reproducing layer 224. Permalloy has the small coercive force, and it exhibits perpendicular magnetization from the ordinary temperature to the Curie temperature. Therefore, even in the case of the ordinary temperature, the transfer occurs owing to the leak magnetic field Hlk of the recording magnetic domain 10a from the recording magnetic domain 10a to the magnetic slit 222 composed of permalloy. In this embodiment, the reproducing layer 224 is composed of Bi-substituted magnetic garnet ($Gd_{1.6}Bi_{1.4}Fe_5O_{12}$ (at %)), and the transparent protective film 207 is composed of $Si_3N_4$. In FIG. 5A, the components common to those of the magnetic lens 111B according to the second embodiment are designated by the same reference numerals, and the functions thereof, for example, will be omitted from explanation.

Figure 5B:
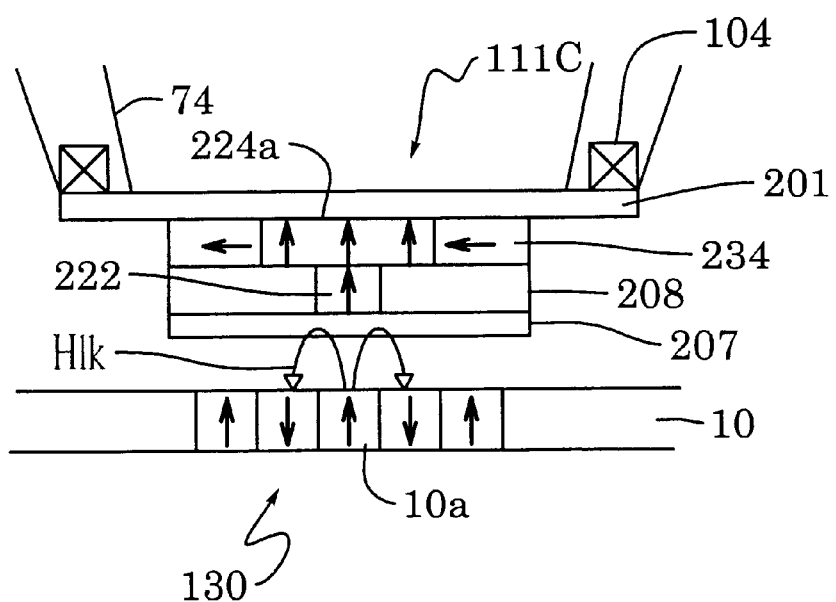
FIG. 5B illustrates the principle of a reproducing method based on the use of the magnetic lens.

The principle of the reproducing method based on the use of the magnetic lens 111C will be explained with reference to FIG. 5B. The information was reproduced by using the same magneto-optical disk 130 as that used in the first embodiment. For the convenience of explanation, the layers of the magneto-optical disk 130 other than the recording layer 10 are omitted from the illustration in FIG. 5B.

When the reproducing light beam 74 as the laser beam is radiated onto the magnetic lens 111C, the magnetic lens 111C is heated to give a temperature distribution corresponding to the distribution of the light intensity (Gaussian distribution) of the laser beam. The reproducing light beam 74 permeates into the magnetic lens 111C, and it heats the magnetic slit 222 in the thermal conductive reflective layer 208. The magnetic slit 222 is heated to a temperature which is not less than the temperature (ordinary temperature) at which the transfer occurs. The coercive force Hc of the magnetic slit 222 becomes lower than the leak magnetic field Hlk from the recording magnetic domain 10a in the recording layer 10. As a result, the magnetization in the magnetic slit 222 is directed in the same direction as that of the magnetization of the recording magnetic domain 10a. That is, the recording magnetic domain 10a is magnetically transferred to the magnetic slit 222 by the aid of the magnetostatic coupling force.

On the other hand, when the reproducing layer 224 is heated by the reproducing light beam 74, the transition occurs from the in-plane magnetization to the perpendicular magnetization in the area of the reproducing layer 224 in which the temperature is not less than the critical temperature Tcr. In this process, the magnetization of the reproducing layer 224 is oriented upwardly as a result of the exchange coupling to the upward magnetization of the magnetic slit 222 transferred from the recording magnetic domain 10a. As shown in FIG. 5B, the magnetization is magnified to the area 224a at which the temperature exceeds the critical temperature. Thus, the magnified area 224a is formed in the reproducing layer 224.

In the magnetic lens 111C of this embodiment, the magnetic slit 222 is composed of permalloy which has the small coercive force. Accordingly, even when the leak magnetic field from the recording magnetic domain 10a is small, then the recording magnetic domain 10a can be reliably transferred to the magnetic slit 222, and it can be magnified in the reproducing layer. Therefore, according to this embodiment, it is possible to provide the magnetic lens having high magnetic field sensitivity. Especially, it should be noted that this embodiment is different from the magnetic lenses concerning the other several embodiments in that the magnetization of the recording magnetic domain 10a can be magnetically transferred to the magnetic slit 222 without radiating the reproducing light beam 74. Therefore, it is easier to adjust the timing for radiating the reproducing light beam 74 during the reproduction.

Fourth Embodiment

Figure 6A:
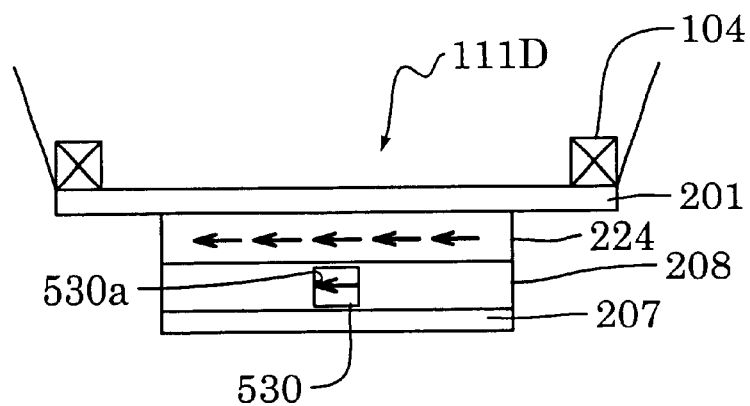
FIG. 6A shows a magnified sectional view illustrating a fourth embodiment of the magnetic lens of the present invention.

FIG. 6A shows a magnified sectional view illustrating a fourth embodiment of the magnetic lens. The magnetic lens 111D of this embodiment is another modified embodiment of the magnetic lens 111B according to the second embodiment. The magnetic lens 111D of this embodiment is constructed in the same manner as in the second embodiment except that a magnetic slit 530 is formed by forming a hollow space 530a in the reflective film 208 of the magnetic lens 111B of the second embodiment, and filling the interior of the hollow space 530a with a magnetic material (GdFeCo alloy) which causes transition from the in-plane magnetization to the perpendicular magnetization at a critical temperature Tcr2 (about 100 to 120° C.). The formation of the hollow space 530a in the reflective film 208 and the charge of the magnetic material into the interior thereof can be carried out by using the lithography in the same manner as in the method for charging silver into the reflective layer in the first embodiment. In FIG. 6A, the components common to those of the magnetic lens 111B according to the second embodiment are designated by the same reference numerals, detailed explanation of which will be omitted.

Figure 6B:
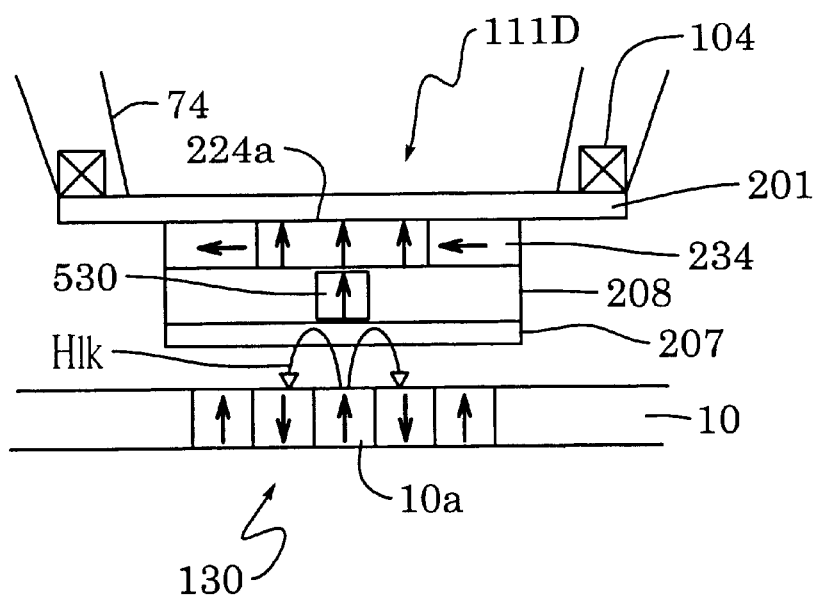
FIG. 6B illustrates the principle of a reproducing method based on the use of the magnetic lens.

Next, the principle of the reproducing method based on the use of the magnetic lens 111D will be explained with reference to FIG. 6B. The information was reproduced by using the same magneto-optical disk 130 as that used in the first embodiment. For the convenience of explanation, the layers of the magneto-optical disk 130 other than the recording layer 10 are omitted from the illustration in FIG. 6B.

When the reproducing light beam 74 as the laser beam is radiated onto the magnetic lens 111D, the magnetic lens 111D is heated to give a temperature distribution corresponding to the distribution of the light intensity (Gaussian distribution) of the laser beam. The reproducing light beam 74 permeates into the magnetic lens 111D, and it heats the magnetic slit 222 in the reflective layer 208. Accordingly, the magnetic slit 222 is heated to a temperature which is not less than the critical temperature Tcr2 of the magnetic slit (=about 100 to 120° C.), and the magnetization of the magnetic slit 222 is rotated from the in-plane direction to the perpendicular direction. Simultaneously, the heating causes the perpendicular magnetization of the magnetic slit 222 to be directed in the same direction (upward direction) as that of the magnetization of the recording magnetic domain 10a by being affected by the leak magnetic field Hlk from the recording magnetic domain 10a of the recording layer 10. That is, the recording magnetic domain 10a is magnetically transferred to the magnetic slit 222 by in accordance with the magnetostatic coupling.

On the other hand, when the reproducing layer 224 is heated by the reproducing light beam 74, the transition occurs from the in-plane magnetization to the perpendicular magnetization in the area of the reproducing layer 224 in which the temperature is not less than the critical temperature Tcr. As shown in FIG. 6B, the area 224a is wider than the widths of the magnetic slit 530 and the recording magnetic domain 10a. In this process, the exchange coupling occurs with respect to the upward magnetization of the magnetic slit 530 in the area of the reproducing layer 224 disposed just over the magnetic slit 530. The exchange coupling force is exerted on the magnetization of the areas disposed on both sides thereof. All of the magnetization is aligned in the upward direction in the area 224a of the reproducing layer 224 in which the temperature is not less than the critical temperature Tcr. As shown in FIG. 6B, it can be recognized that the upward magnetization of the reproducing layer 224 is magnified up to the area 224a in which the temperature exceeds the critical temperature. A reproduced signal is obtained by detecting the reflected light beam of the reproducing light beam 74 from the magnetic domain-magnified area 224a. As described above, the magnetic lens 111D of this embodiment also makes it possible to magnify the magnetization information on the recording layer in the reproducing layer and read the recorded information with the large reproduced signal intensity.

Fifth Embodiment

Figure 7A:
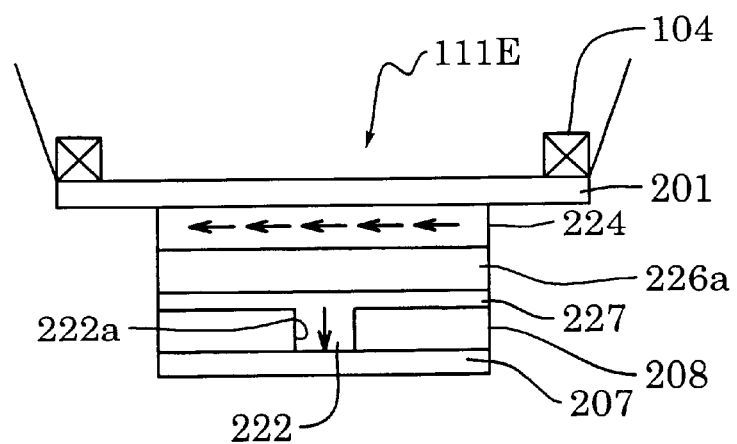
FIG. 7A shows a magnified sectional view illustrating a fifth embodiment of the magnetic lens of the present invention.

FIG. 7A shows a magnified sectional view illustrating a fifth embodiment of the magnetic lens. A magnetic lens 111E of this embodiment has a stacked structure formed by stacking, in an order of those disposed nearer to the magnetic coil 104, a GGG substrate 201, a reproducing layer 224, a non-magnetic layer 226a, a second auxiliary magnetic layer 227, a thermal conductive reflective film 208, and a transparent protective film 207. In the structure shown in FIG. 7A, the non-magnetic layer 226a is composed of the same material (gadolinium•galliume•garnet) as that used for the GGG layer of the magnetic lens 111A according to the first embodiment. The second auxiliary magnetic layer 227 is composed of the same material, i.e., Bi-substituted magnetic garnet as that used for the magnetic slit 222 of the magnetic lens 111A according to the first embodiment. In FIG. 7A, the components common to those of the magnetic lens 111A of the first embodiment are designated by the same reference numerals, detailed explanation of which will be omitted.

The magnetic lens 111E having the structure as described above comprises a slit-shaped opening 222a which is formed at a central portion of the thermal conductive reflective film 208. In this embodiment, the magnetic slit 222 was formed by filling the interior of the opening 222a with the same material (Bi-substituted magnetic garnet) as that for the second auxiliary magnetic layer 227. The width (diameter) of the magnetic slit 222 was about 0.1 μm.

Figure 7B:
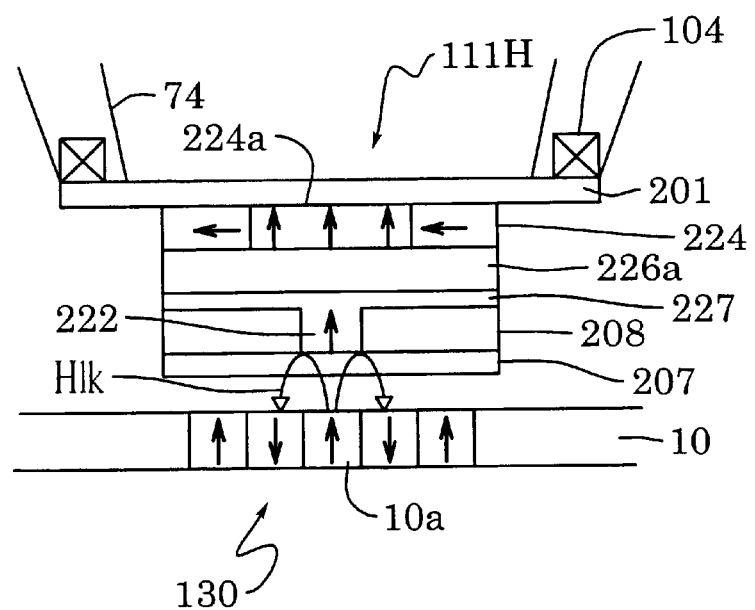
FIG. 7B illustrates the principle of a reproducing method based on the use of the magnetic lens.

Next, explanation will be made with reference to FIG. 7B for the principle of the reproducing method based on the use of the magnetic lens 111E. When the information was reproduced, the same magneto-optical disk 130 as that used in the first embodiment was used. In FIG. 7B, the layers of the magneto-optical disk 130 other than the recording layer 10 are omitted from the illustration for the convenience of explanation.

When the reproducing light beam 74 as the laser beam is radiated onto the magnetic lens 111E, the magnetic lens 111E is heated to give a temperature distribution corresponding to the distribution of the light intensity (Gaussian distribution) of the laser beam. The reproducing light beam 74, which is radiated onto the magnetic lens 111E, permeates into the magnetic lens 111E, and it heats the magnetic slit 222 in the thermal conductive reflective layer 208. When the magnetic slit 222 is heated to a temperature Ttr (=about 180 to 200° C.) exceeding the temperature (not more than 100° C.) necessary for the transfer, then the coercive force Hc is lowered, and it becomes smaller than the leak magnetic field from the recording magnetic domain 10a of the recording layer 10 disposed just under the magnetic slit 222. As a result, the magnetization of the magnetic slit 222 is inverted into the same direction as that of the recording magnetic domain 10a. That is, the recording magnetic domain 10a is magnetically transferred to the magnetic slit 222.

On the other hand, when the reproducing layer 224 is heated by the reproducing light beam 74, the transition occurs from the in-plane magnetization to the perpendicular magnetization in the area of the reproducing layer 224 in which the temperature is not less than the critical temperature Tcr. During this process, the exchange coupling occurs with respect to the upward magnetization of the magnetic slit 222 transferred from the recording magnetic domain 10a in the area of the reproducing layer 224 disposed just over the magnetic slit 222. As shown in FIG. 7B, the upward magnetization in the area of the reproducing layer 224 is magnified by the exchange coupling force in the reproducing layer 224 up to the area in which the temperature exceeds the critical temperature. Thus, the magnified area 222a is formed. A reproduced signal is obtained by detecting the reflected light beam of the reproducing light beam 74 from the magnetic domain-magnified area 224a. As described above, the magnetic lens according to this embodiment also makes it possible to magnify, in the reproducing layer, the magnetization information recorded on the recording layer and read the recorded information with the large reproduced signal intensity.

Sixth Embodiment

Figure 8:
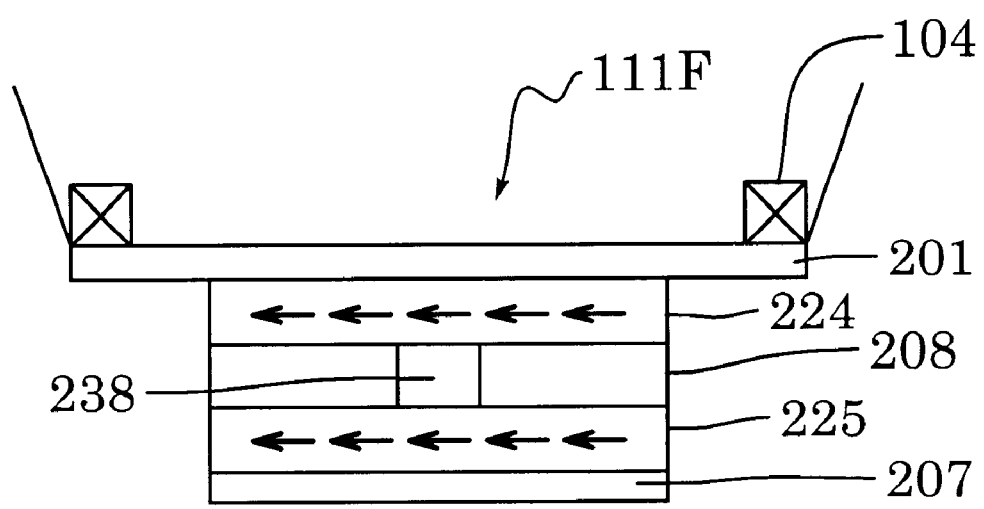
FIG. 8 shows a magnified sectional view illustrating a sixth embodiment of the magnetic lens of the present invention.
Figure 18:
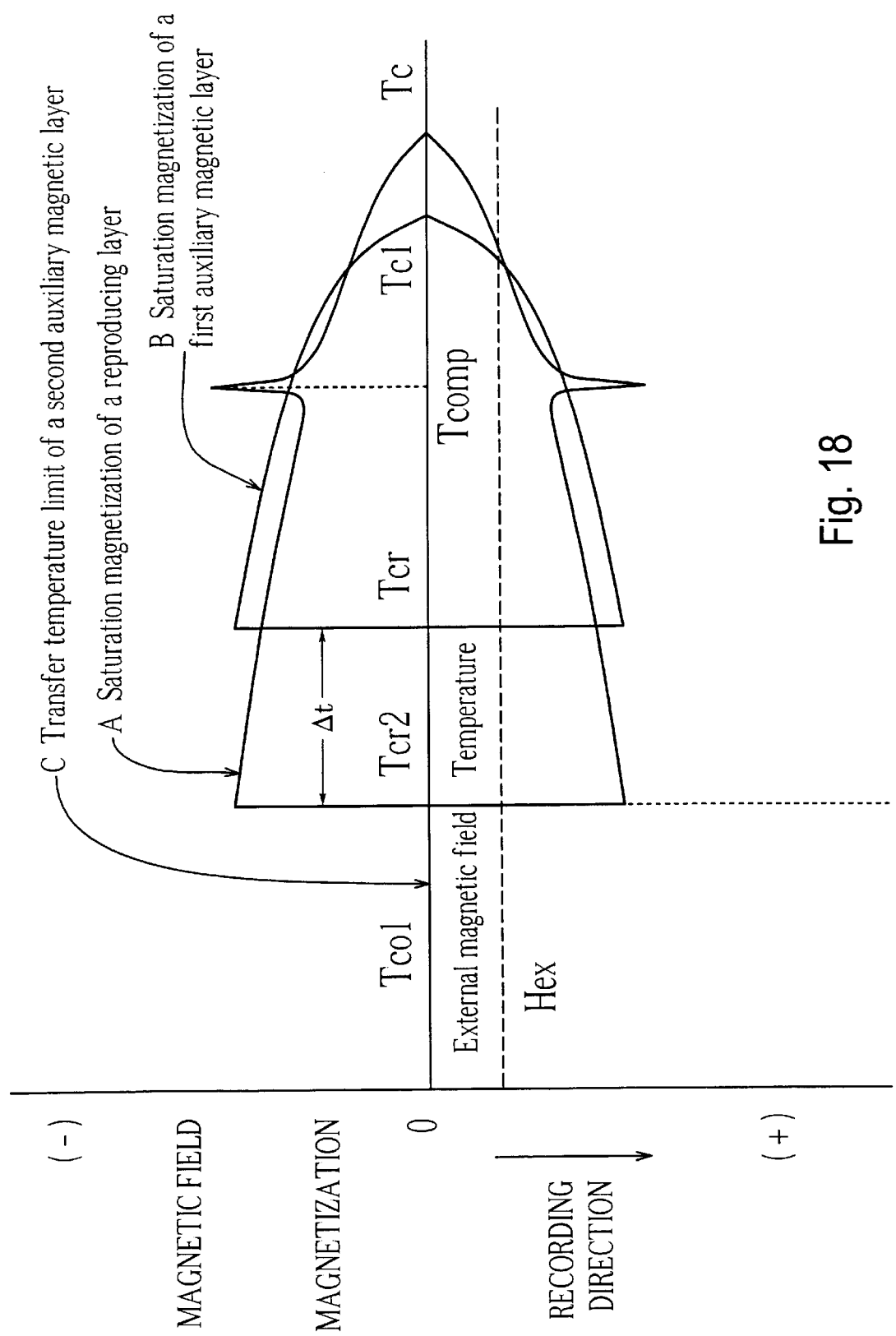
FIG. 18 shows magnetization characteristics of a reproducing layer, a first auxiliary magnetic layer, and a second auxiliary magnetic layer for constructing the magnetic lens according to the present invention.

FIG. 8 shows a magnified sectional view illustrating a sixth embodiment of the magnetic lens. A magnetic lens 111F of this embodiment has a stacked structure formed by stacking, in an order of those disposed nearer to the magnetic coil 104, a glass transparent substrate 201, a reproducing layer 224 composed of GdFeCo alloy having a thickness of 1.5 μm, a thermal conductive reflective film 208 composed of AlTi alloy having a thickness of 0.3 μm, a first auxiliary magnetic layer 225 composed of GdFeCo alloy having a thickness of 1.2 μm, and a transparent protective film 207 composed of ultraviolet-curable resin. The first auxiliary magnetic layer 225 is a magnetic film which cause transition from the in-plane magnetization to the perpendicular magnetization at a critical temperature Tcr1 (=about 200° C.). FIG. 18 shows the temperature-dependent change of the saturation magnetization of the first auxiliary magnetic layer 225 and the reproducing layer 224. The critical temperature and the Curie temperatures of the first auxiliary magnetic layer 225 are indicated by Tcr1 and Tc1 respectively. The critical temperature and the Curie temperatures of the reproducing layer 224 are indicated by Tcr and Tc respectively. In this embodiment, as shown in the drawing, the critical temperature Tcr1 of the first auxiliary magnetic layer 225 is set to be higher than the critical temperature Tcr (=about 150° C.) of the reproducing layer 224. The first auxiliary magnetic layer 225 and the reproducing layer 224 are in the state of in-plane magnetization from a low temperature to the respective critical temperatures Tcr1 and Tcr.

With reference to FIG. 8, a slit-shaped opening 238 is formed at a central portion of the reflective film 208 of the magnetic lens 111F. The interior of the opening 238 is filled with silver which is a material having a high thermal conductivity, in the same manner as in the magnetic lens 111A according to the first embodiment. The width (diameter) of the opening 238 was about 0.1 μm. In FIG. 8, the components common to those of the magnetic lens 111A according to the first embodiment are designated by the same reference numerals, detailed explanation of which will be omitted.

Figure 9:
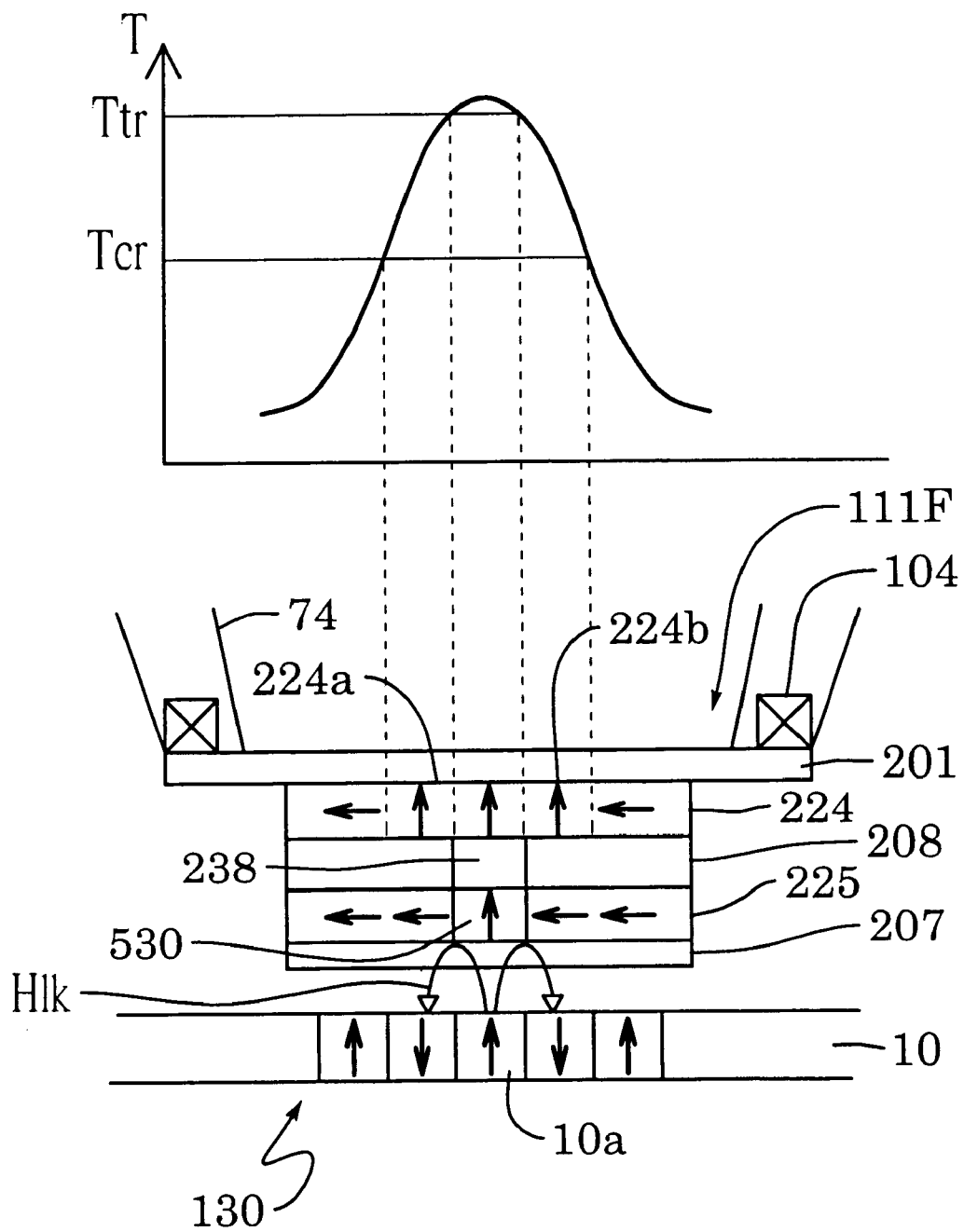
FIG. 9 illustrates the principle of a reproducing method on a magneto-optical disk based on the use of a magnetic lens 111F according to the sixth embodiment.

Next, explanation will be made with reference to FIG. 9 for the principle of the reproducing method based on the use of the magnetic lens 111F. When the information was reproduced, the same magneto-optical disk 130 as that used in the first embodiment was used. In FIG. 9, the layers of the magneto-optical disk 130 other than the recording layer 10 are omitted from the illustration for the convenience of explanation.

When the reproducing light beam 74 as the laser beam is radiated onto the magnetic lens 111F, the magnetic lens 111F is heated to give a temperature distribution corresponding to the distribution of the light intensity (Gaussian distribution) of the laser beam, as conceptually illustrated in an upper part of FIG. 9. In the case of the laser beam which follows the Gaussian distribution, the center of the light spot has the highest temperature. Therefore, the temperature is the highest at the central portion of the magnetic lens 111F. The reproducing light beam 74, which is radiated onto the magnetic lens 111F, permeates into the magnetic lens 111F, and it heats the reproducing layer 224 and the first auxiliary magnetic layer 225. In this embodiment, as shown in the temperature distribution depicted in FIG. 9, the critical temperature Tcr of the reproducing layer 224 is set to be lower than the critical temperature Tcr1 of the first auxiliary magnetic layer 225 (Tcr<Tcr1). Therefore, the magnetization is rotated in the vertical direction in the reproducing layer 224 over an area which is wider than that of the first auxiliary magnetic layer 225. The critical temperature Tcr1 of the first auxiliary magnetic layer 225 is adjusted as follows. That is, the power of the reproducing light beam 74 as well as the components and the composition of the first auxiliary magnetic layer 225 are adjusted so that the temperature area, which is heated to the temperature not less than the critical temperature, has approximately the same size as that of the recording magnetic-domain 10a of the recording layer 10.

When the second auxiliary magnetic layer 225 is heated, the area 530 of the first auxiliary magnetic layer having approximately the same size as that of the recording magnetic domain 10a, consequently arrives at a temperature not less than the critical temperature Tcr1 as shown in FIG. 9 to cause the transition from the in-plane magnetization to the perpendicular magnetization. During this process, the magnetization of the area 530 of the first auxiliary magnetic layer 225 is oriented in the same direction as that of the magnetization of the recording magnetic domain 10a by the aid of the leak magnetic field from the recording magnetic domain 10a of the recording layer 10 existing just under the first auxiliary magnetic layer 225. That is, the recording magnetic domain 10a is magnetically transferred to the first auxiliary magnetic layer 225. The magnetization of the area, 530 of the first auxiliary magnetic layer 225 is transferred in accordance with the magnetostatic coupling-to the central portion 224b of the perpendicularly magnetizable area of the reproducing layer 224 via the opening 238 of the thermal conductive reflective film 208 disposed just thereover. The magnetization, which is transferred to the central portion 224b of the reproducing layer 224, is magnified up to the temperature area in which the temperature exceeds the critical temperature Tcr. Thus, the magnified area 224a is formed in the reproducing layer 224. A reproduced signal is obtained by detecting the reflected light beam of the reproducing light beam 74 from the magnified area 224a. As described above, the magnetic lens 111F according to this embodiment also makes it possible to transfer and magnify the magnetization information on the recording layer and read the recorded information with the amplified reproduced signal intensity. In this embodiment, the area 530 of the first auxiliary magnetic layer 225 functions as the magnetic slit.

In this embodiment, the opening 238 of the thermal conductive reflective film 208 is filled with silver. However, as explained in the first embodiment, the opening 238 may be filled with a material having a high magnetic permeability, for example, permalloy, ferrite, supermalloy (for example, $Ni_{79}Fe_{15.5}Mo_{5.0}Mn_{0.5}$ (wt %)), and sendust (for example, $Fe_{87.7}Si_{6.9}Al_{5.4}$). Accordingly, the magnetization of the area 530 of the first auxiliary magnetic layer 225 can be transferred to the central portion 224b of the perpendicularly magnetizable area of the reproducing layer 224 in accordance with the exchange coupling by the aid of the opening 238 of the thermal conductive reflective film 208.

Seventh Embodiment

Figure 10A:
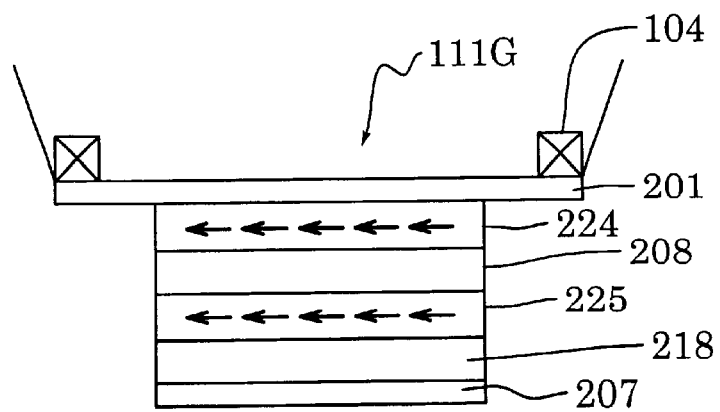
FIG. 10A shows a magnified sectional view illustrating a seventh embodiment of the magnetic lens of the present invention.

FIG. 10A shows a magnified sectional view illustrating a seventh embodiment of the magnetic lens. The magnetic lens 111G of this embodiment has the same structure as that of the magnetic lens 111F except that a thermal conductive reflective film 208 including no opening 238 is formed, and a second thermal conductive reflective film 208 composed of AlTi having a thickness of 0.09 $\mu$m is provided between the first auxiliary magnetic layer 225 and the transparent protective film 207 in the magnetic lens 111F shown in FIG. 8. In this embodiment, the substrate 201 is composed of GGG (gadolinium·gallium·garnet). The reproducing layer 224 has a thickness of 1.1 $\mu$m, the thermal conductive reflective film has a thickness of 0.1 $\mu$m, and the first auxiliary magnetic layer 225 has a thickness of 0.9 $\mu$m. In FIG. 10A, the components common to those of the magnetic lens 111F according to the sixth embodiment are designated by the same reference numerals, detailed explanation of which will be omitted.

Figure 10B:
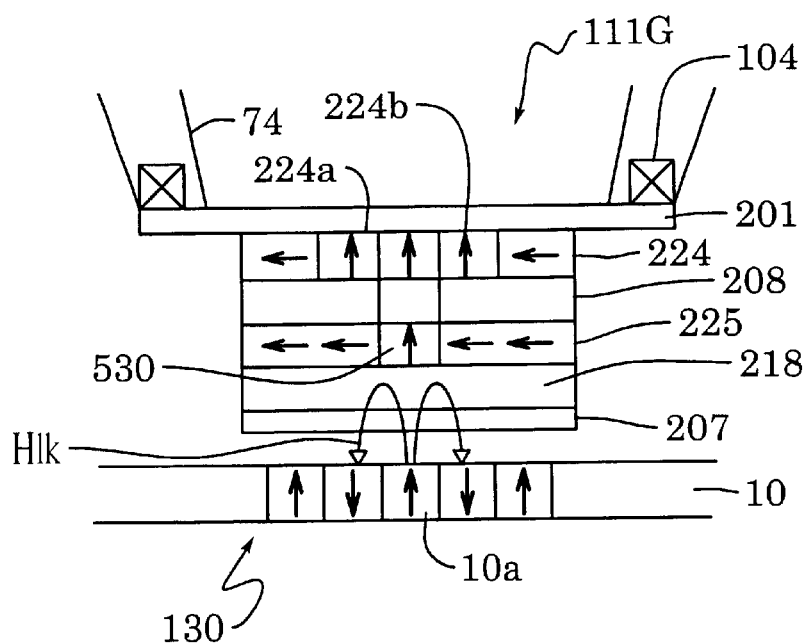
FIG. 10B illustrates the principle of a reproducing method based on the use of the magnetic lens.

Next, the principle of the reproducing method based on the use of the magnetic lens 111G will be explained with reference to FIG. 10B. The information was reproduced by using the same magneto-optical disk 130 as that used in the first embodiment. For the convenience of explanation, the layers of the magneto-optical disk 130 other than the recording layer 10 are omitted from the illustration in FIG. 10B.

When the reproducing light beam 74 as the laser beam is radiated onto the magnetic lens 111G, the magnetic lens 111G is heated to give a temperature distribution corresponding to the distribution of the light intensity (Gaussian distribution) of the laser beam. The reproducing light beam 74 radiated onto the magnetic lens 111G permeates into the magnetic lens 111G, and it heats the reproducing layer 224 and the first auxiliary magnetic layer 225. Accordingly, the area 530 (magnetic slit) of the first auxiliary magnetic layer 225, which has approximately the same size as that of the recording magnetic domain 10a, is heated to a temperature not less than the critical temperature to cause transition from the in-plane magnetization to the perpendicular magnetization as shown in FIG. 10B in accordance with the same principle as that of the sixth embodiment. During this process, the leak magnetic field from the recording magnetic domain 10a of the recording layer 10 arrives at the area 530 of the first auxiliary magnetic layer 225 via the second thermal conductive reflective layer 218. The magnetization of the area 530 of the second auxiliary magnetic layer 225 is aligned in the same direction as that of the magnetization of the recording magnetic domain 10a. That is, the recording magnetic domain 10a is magnetically transferred to the second auxiliary magnetic layer 225 in accordance with the magnetostatic coupling.

The magnetization of the area 530 of the first auxiliary magnetic layer 225 is transferred to the central portion 224b of the reproducing layer 224 in accordance with the magnetostatic coupling via the thermal conductive reflective layer 208 disposed just thereover. As shown in FIG. 10B, the magnetization of the central portion 224b of the reproducing layer 224 is magnified to the temperature area in which the temperature exceeds the critical temperature by the aid of the exchange coupling force exerted in the reproducing layer 224. Thus, the magnified area 224a is formed. A reproduced signal is obtained by detecting the reflected light beam of the reproducing light beam 74 from the magnified area 224a. In this process, the light beam, which has passed through the magnified area 224a, is subjected to multiple reflection between the thermal conductive reflective film 208 and the second thermal conductive reflective film 218, and then it comes from the reproducing layer 224. Therefore, the Kerr rotation angle is effectively increased owing to the interference effect of light. Thus, it is possible to detect the reproduced signal having a larger amplitude.

Eighth Embodiment

Figure 11A:
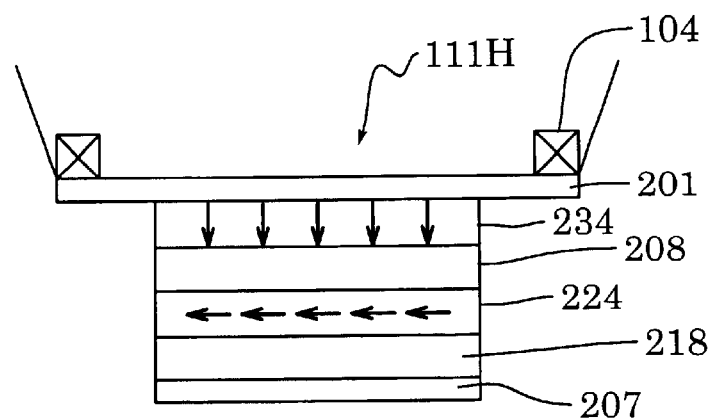
FIG. 11A shows a magnified sectional view illustrating an eighth embodiment of the magnetic lens of the present invention.

FIG. 11A shows a magnified sectional view illustrating an eighth embodiment of the magnetic lens. A magnetic lens 111H of this embodiment has a stacked structure formed by stacking, in an order of those disposed nearer to the magnetic coil 104, on a glass transparent substrate 201, a second reproducing layer 234 composed of perpendicularly magnetizable material having a thickness of 1.5 $\mu$m, a thermal conductive reflective film 208 composed of AlTi alloy having a thickness of 0.3 μm, a reproducing layer 224 composed of GdFeCo alloy having a thickness of 1.3 μm, a second thermal conductive reflective film 218 composed of Ti metal having a thickness of 0.5 μm, and a transparent protective film 207 composed of ultraviolet-curable resin. In this structure, the second reproducing layer 234 is a magnetic layer which has such magnetic characteristics that the Kerr rotation angle is larger than that of the reproducing layer 224, and the coercive force is smaller than that of the reproducing layer 224. The second reproducing layer 234 is composed of the GdFeCo alloy. In FIG. 11A, the components common to those of the magnetic lens 111A of the first embodiment are designated by the same reference numerals, detailed explanation of which will be omitted.

Figure 11B:
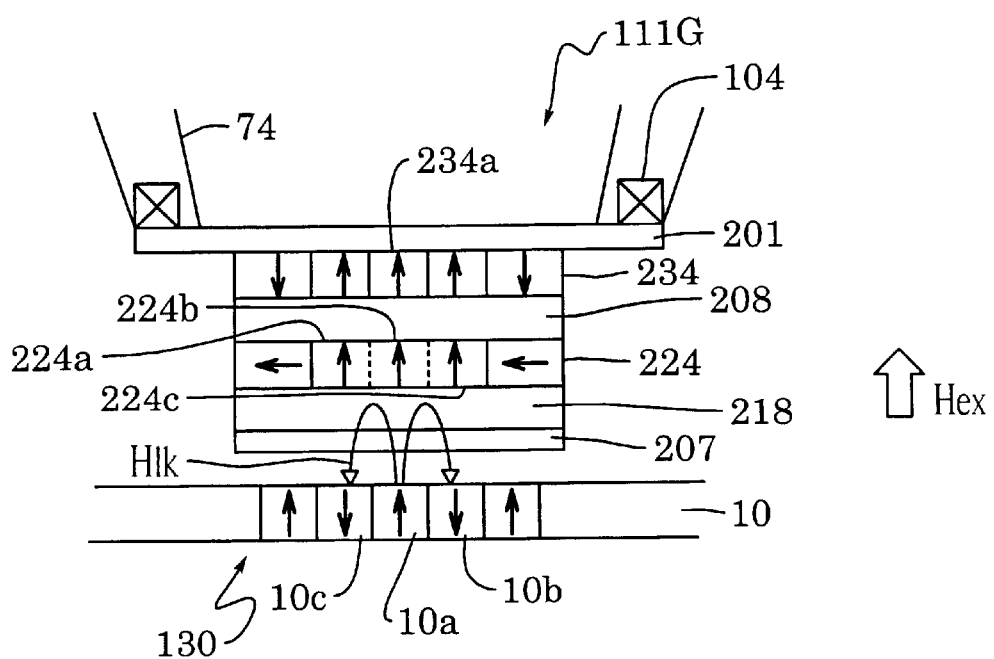
FIG. 11B illustrates the principle of a reproducing method based on the use of the magnetic lens.

Next, explanation will be made with reference to FIG. 11B for the principle of the reproducing method based on the use of the magnetic lens 111H. When the information was reproduced, the same magneto-optical disk 130 as that used in the first embodiment was used. In FIG. 11B, the layers of the magneto-optical disk 130 other than the recording layer 10 are omitted from the illustration for the convenience of explanation.

In this embodiment, when the recording magnetic domain 10a in the recording layer 10 was read by using the magnetic lens 111H, the magnetic coil 104 was used to apply a reproducing magnetic field in the recording direction (upward direction in the drawing).

When the reproducing light beam 74 is radiated onto the magnetic lens 111H, the magnetic lens 111H is heated to give a temperature distribution corresponding to the distribution of the light intensity (Gaussian distribution) of the reproducing laser beam. The reproducing light beam 74, which is radiated onto the magnetic lens 111H, permeates into the magnetic lens 111H, and it heats the reproducing layer 224 and the second reproducing layer 234. Accordingly, a predetermined area of the reproducing layer 224 is heated to a temperature not less than the critical temperature to form a perpendicular magnetization area 224a subjected to the transition to the perpendicular magnetization. The critical temperature Tcr of the reproducing layer 224 is adjusted so that the perpendicular magnetization area 224a has a size larger than that of the recording magnetic domain 10a. In the case of the laser beam which follows the Gaussian distribution, the center of the light spot has the highest temperature. Therefore, the central portion 224b (magnetic slit) of the perpendicular magnetization area 224a of the reproducing layer 224 has the highest temperature. As a result, the coercive force of the central portion 224b of the perpendicular magnetization area 224a is remarkably lowered. The magnetization of the central portion 224b of the perpendicular magnetization area 224a is directed in the same direction as that of the recording magnetic domain 10a by means of a combined magnetic field of the leak magnetic field Hlk from the recording magnetic domain 10a and the external magnetic field Hex applied by the magnetic coil.

On the other hand, magnetic domains 10b, 10b' other than the recording magnetic domain 10a, which have the downward magnetization, exist just under the circumferential portion 224c of the perpendicular magnetization area 224a. However, the downward leak magnetic fields from the magnetic domains 10b, 10b' are weakened by the upward reproducing magnetic field Hex. Therefore, no transfer occurs to the perpendicular magnetization area 224a of the reproducing layer 224.

The upward magnetization, which is transferred to the central portion 224b of the perpendicular magnetization area 224a, is magnified to form the magnified area in the perpendicular magnetization area 224a in which the temperature is not less than the critical temperature. In the heated area 234a of the second reproducing layer 234, the coercive force is lowered to be smaller than the sum of the external magnetic field and the leak magnetic field from the reproducing layer 224. Accordingly, the magnetization of the perpendicular magnetization area 224a is transferred by the magnetostatic coupling via the thermal conductive reflective layer 208 to the second reproducing layer 234 while maintaining approximately the same size. Thus, the magnified area 234a is formed on the second reproducing layer. A reproduced signal is obtained by detecting the reflected light beam of the reproducing light beam 74 from the magnified area 234a. The second reproducing layer 234 is composed of the material having the large Kerr rotation angle. Therefore, the reproduced signal having the large signal intensity is detected from the second reproducing layer 234. Further, the light beam, which passes through the magnified area 234a of the second reproducing layer 234, is subjected to multiple reflection between the thermal conductive reflective film 208 and the second thermal conductive reflective film 218, and then it outgoes from the second reproducing layer 234. Therefore, the Kerr rotation angle is effectively increased owing to the interference effect of light. Thus, it is possible to detect the reproduced signal having the larger amplitude.

Ninth Embodiment

Figure 12A:
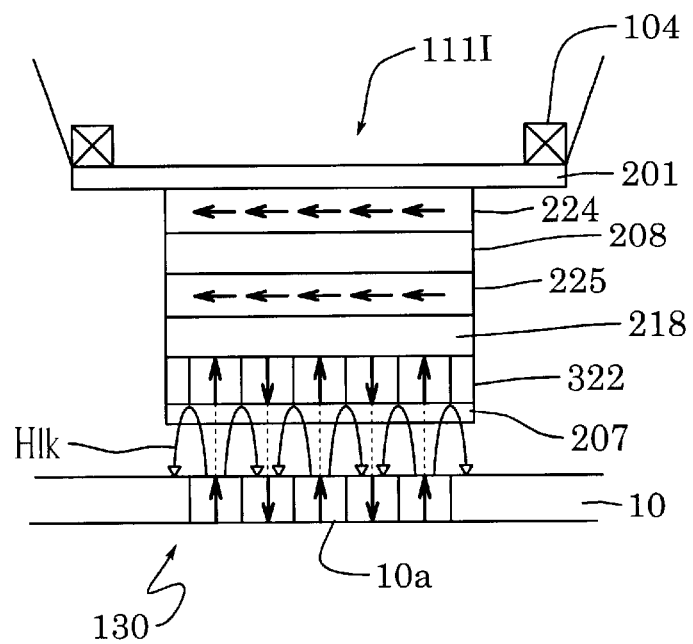
FIG. 12A shows a magnified sectional view illustrating a ninth embodiment of the magnetic lens of the present invention.

FIG. 12A shows a magnified sectional view illustrating a ninth embodiment of the magnetic lens. The magnetic lens 111I of this embodiment is a modified embodiment of the seventh embodiment. The magnetic lens 111I of this embodiment has the same structure as that of the magnetic lens 111F except that a third auxiliary magnetic layer 322 having perpendicular magnetization is provided between the thermal conductive reflective film 218 and the transparent protective film 207 in the magnetic lens 111G shown in FIG. 10. The third auxiliary magnetic layer 322 is composed of GdFe. In FIG. 12A, the components common to those of the magnetic lens 111G according to the seventh embodiment are designated by the same reference numerals, detailed explanation of which will be omitted.

Figure 12B:
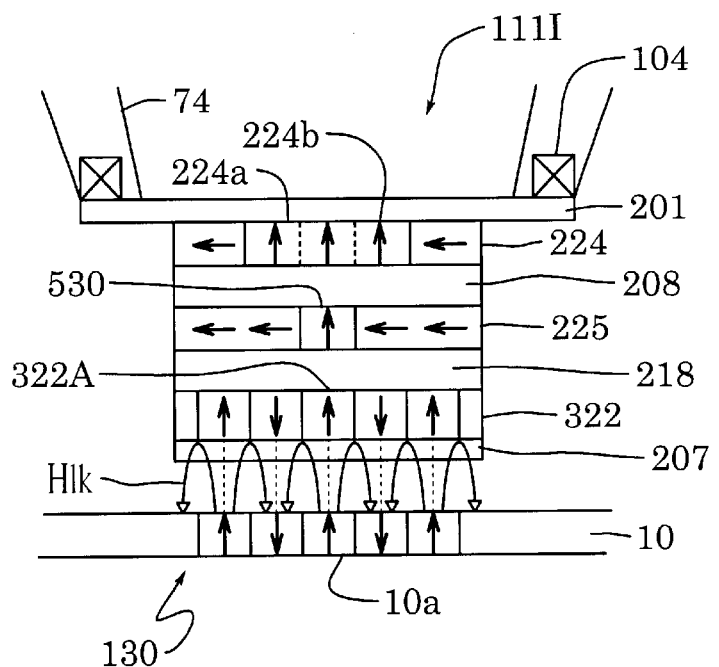
FIG. 12B illustrates the principle of a reproducing method based on the use of the magnetic lens.

Next, the principle of the reproducing method based on the use of the magnetic lens 111I will be explained with reference to FIG. 12B. The information was reproduced by using the same magneto-optical disk 130 as that used in the first embodiment. For the convenience of explanation, the layers of the magneto-optical disk 130 other than the recording layer 10 are omitted from the illustration in FIG. 12B.

In this embodiment, the respective recording magnetic domains in the recording layer 10 existing just under the magnetic lens 111I are once magnetically transferred to the third auxiliary magnetic layer 322 in accordance with the magnetostatic coupling. A predetermined magnetic domain of the magnetic domains transferred to the third auxiliary magnetic layer 322 is transferred to the reproducing layer 224 on the basis of the principle described in the seventh embodiment. That is, when the reproducing light beam 74 is radiated, then the central area 530 of the first auxiliary magnetic layer 225 is heated to arrive at the critical temperature, and the magnetization of the area 530 causes transition from the in-plane magnetization to the perpendicular magnetization. In this process, the magnetization of the magnetic domain 322a of the third auxiliary magnetic layer 322, which is disposed just under the area 530 of the first auxiliary magnetic layer, is transferred by the magnetostatic coupling via the second thermal conductive reflective layer 218 to the area 530 (magnetic slit) of the first auxiliary magnetic layer. Further, the magnetization of the area 530 of the first auxiliary magnetic layer is transferred by the magnetostatic coupling via the thermal conductive reflective layer 208 to the central area 224b of the reproducing layer 224 which is in the state of perpendicular magnetization. The magnetization, which is transferred to the area 224b of the reproducing layer 224, is magnified up to the temperature area in which the temperature exceeds the critical temperature Tcr to form the magnified area 224a. A reproduced signal is obtained by detecting the reflected light beam of the reproducing light beam 74 from the magnified area 224. As described above, the magnetic lens 111I of this embodiment also makes it possible to magnify the magnetization information on the recording layer in the reproducing layer and read the recorded information with the large intensity of the reproduced signal.

Tenth Embodiment

Figure 13A:
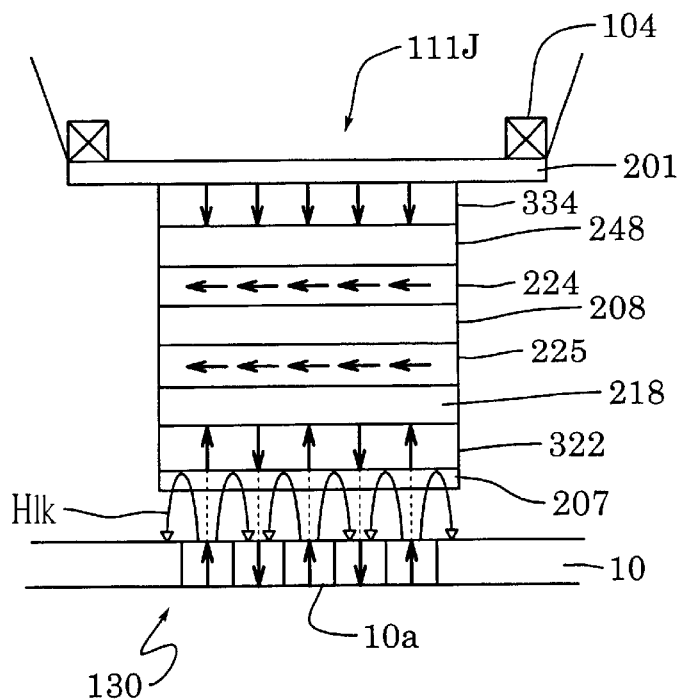
FIG. 13A shows a magnified sectional view illustrating a tenth embodiment of the magnetic lens of the present invention.

FIG. 13A shows a magnified sectional view illustrating a tenth embodiment of the magnetic lens. The magnetic lens 111J of this embodiment is a modified embodiment of the magnetic lens 111I of the ninth embodiment. The magnetic lens 111J has the same structure as that of the magnetic lens 111I of the ninth embodiment except that a third reproducing layer 334 composed of a perpendicularly magnetizable material having a large Kerr rotation angle and a third thermal conductive reflective layer 248 composed of AlTi are provided in this order from the side of the substrate 201 between the substrate 201 and the reproducing layer 224 in the magnetic lens 111I of the ninth embodiment. Those selectively usable for the third reproducing layer 334 include, for example, amorphous alloy of rare earth-transition metal such as DyFeCo alloy, TbDyFeCo alloy, TbFeCoCr alloy, GdFeCoCr alloy, GdTbFeCo alloy, NdFeCo alloy, GdFe alloy, and GdDyFeCo ally, alternate stacked material composed of Pt film and Co film, magnetic garnet such as Bi-substituted type magnetic garnet, transparent ferrite, yttrium-iron garnet, and rare earth-iron garnet, PtCo alloy, CoCr alloy, CoCrTa alloy, and CoNiCr alloy. In this embodiment, the compositions of the materials for constituting the third reproducing layer 334 and the reproducing layer 224 are adjusted so that the coercive force of the area of the third reproducing layer 334 heated by the reproducing light beam 74 is larger than the sum of the external magnetic field Hex and the leak magnetic field of the reproducing layer 224 in the vertical direction. In FIG. 13A, the components common to those of the magnetic lens 111I according to the ninth embodiment are designated by the same reference numerals, detailed explanation of which will be omitted.

Figure 13B:
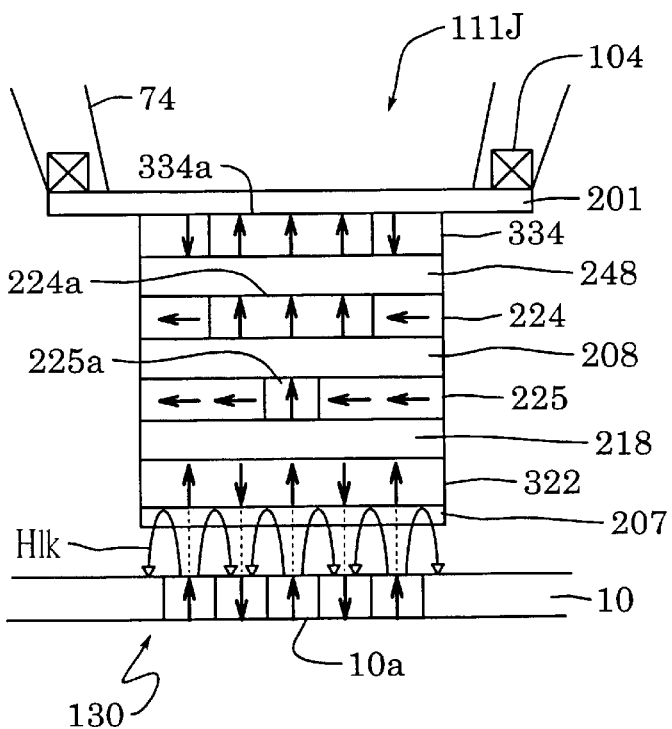
FIG. 13B illustrates the principle of a reproducing method based on the use of the magnetic lens.

Next, the principle of the reproducing method based on the use of the magnetic lens 111J will be explained with reference to FIG. 13B. The information was reproduced by using the same magneto-optical disk 130 as that used in the first embodiment. For the convenience of explanation, the layers of the magneto-optical disk 130 other than the recording layer 10 are omitted from the illustration in FIG. 13B.

The magnetic lens 111J of this embodiment is operated on the basis of the principle described in the ninth embodiment. That is, the recording magnetic domain 10a in the recording layer 10 is successively transferred to the area 322a of the third auxiliary magnetic layer 322 and the area 225a (magnetic slit) of the first auxiliary magnetic layer 225, followed by transfer to the reproducing layer 224 to cause magnification so that the magnetic domain-magnified area 224 is formed on the reproducing layer 224. The magnetization of the magnetic domain-magnified area 224a in the reproducing layer 224 is transferred by the magnetostatic coupling under the external magnetic field Hex via the third thermal conductive reflective layer 248 to the third reproducing layer 334. Accordingly, a magnified area 334a is formed in the third reproducing layer 334. The third reproducing layer 334 is composed of the magnetic material having the large Kerr rotation angle. Therefore, a reproduced signal having large signal intensity is detected from the third reproducing layer 334. The light beam, which is transmitted through the magnified area 334, is subjected to multiple reflection between the thermal conductive reflective film 208 and the third thermal conductive reflective film 248, and it outgoes from the third reproducing layer 334. Therefore, the Kerr rotation angle is effectively increased owing to the interference effect of light. Thus, it is possible to detect the reproduced signal having the larger amplitude.

Eleventh Embodiment

Figure 16:
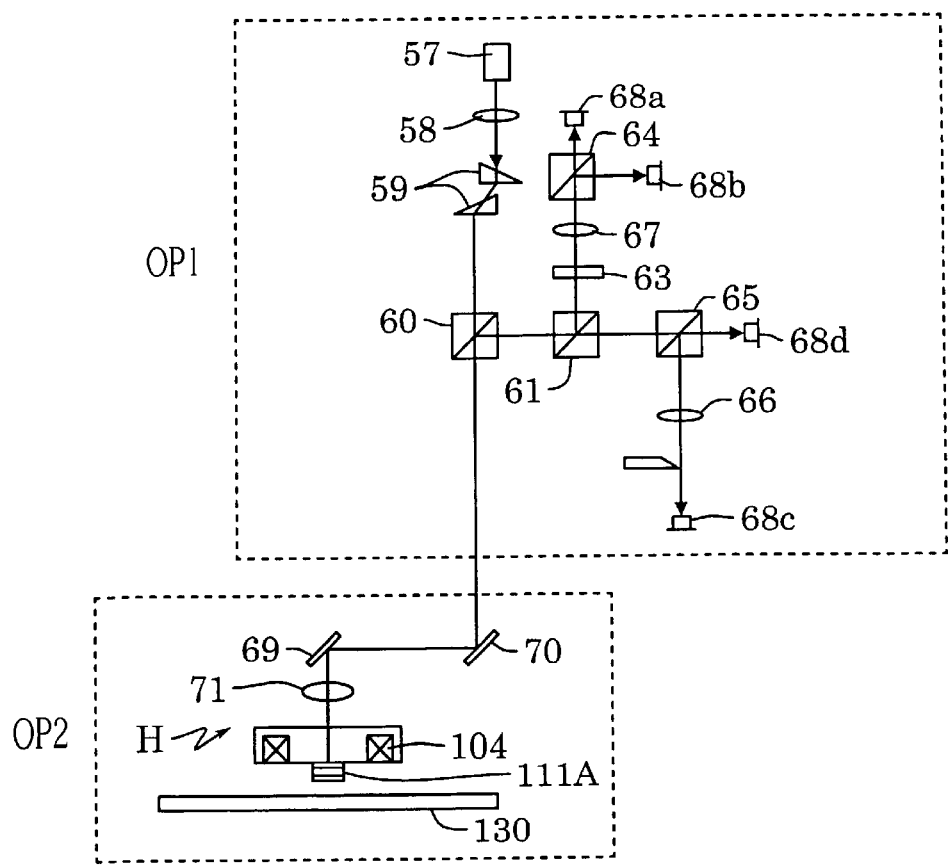
FIG. 16 schematically shows an optical system of a recording and reproducing apparatus capable of installing the magnetic lens 111A to 111J thereto.

Next, an optical system of a recording and reproducing apparatus, to which any one of the magnetic lenses 111A to 111J according to the first to tenth embodiment, is shown in the drawings. As shown in FIG. 16, the optical system OP principally comprises a fixed optical system OP1 which is fixed in the apparatus, and a movable optical system OP2 which is movable over the magneto-optical disk 130. The fixed optical system OP1 corresponds to the optical system 1 shown in FIG. 19. The movable optical system OP2 includes, for example, the optical elements supported by the arm rotary shaft 196, the first arm 192, and the second arm 112. The magnetic lens described in any one of the first to tenth embodiments is incorporated into a head section H of the movable optical system OP2. The magnetic lens 111A of the first embodiment is shown in the drawing. With reference to FIG. 16, the laser beam, which is radiated from a laser light source 57, passes through a collimator lens 58, a prism 59, and a beam splitter 60, and it comes into a mirror 70 of the movable optical system OP2. The light beam, which comes into the mirror 70 of the movable optical system OP2, is reflected by the mirrors 70, 69, and then it comes into an objective lens 71. The light beam is collected onto the magnetic lens 111A.

Upon the reproduction, the reflected light beam from the magnetic lens 111A is reflected by the mirrors 69, 70, and then it is reflected by the beam splitter 60. The light beam is divided by a beam splitter 61 into the light beams directed to two beam splitters 64, 65. The reflected light beam, which comes into the beam splitter 65, is further divided thereby. One of the light beams passes through a lens 66, and it comes into a focus detector 68c. The other light beam comes into a tracking signal detector 68d. The reflected light beam, which passes through a half-wavelength plate 63 and a lens 67 to come into the beam splitter 64, comes into photodetectors 68a, 68b for detecting polarization light components perpendicular to one another to detect a reproduced signal.

As shown in FIG. 17, the movable optical system OP2 may be alternatively constructed such that the magnetic head for applying the magnetic field to the magneto-optical disk 130 is arranged at a position opposed to the optical head with the magneto-optical disk 130 interposed therebetween.

Twelfth Embodiment

In this embodiment, the information recorded on a magnetic disk was reproduced by using the magnetic lens 111D according to the fourth embodiment. The principle of reproduction will be explained with reference to FIGS. 14A and 14B.

The magnetic disk used in this embodiment has a structure comprising a magnetic recording layer having in-plane magnetization and a protective layer which are stacked in this order on one surface of a glass substrate. However, for the convenience of explanation, all of the layers other than the magnetic recording layer 110 are omitted from the illustration in FIGS. 14A and 14B.

Figure 14A:
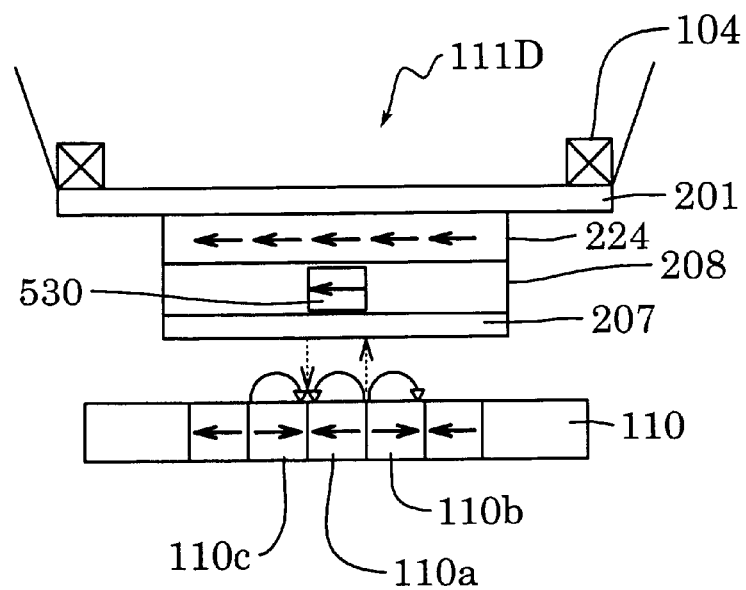
FIG. 14A illustrates a reproducing method on a magnetic disk based on the use of the magnetic lens according to the embodiment, depicting a situation in which a magnetic slit 530 is positioned just over a magnetic domain 110a of a magnetic recording layer.

As shown in FIG. 14A, magnetic domains 110a to 110c, which have magnetization components in the in-plane directions (right and left directions in the drawing), are formed in the magnetic recording layer 110 of the magnetic disk. Leak magnetic fields having components in the vertical direction are generated just over the boundaries between the respective magnetic domains. For example, in FIG. 14A, the leak magnetic field having the vertically downward component is generated just over the boundary between the magnetic domain 110c having the rightward magnetization and the magnetic domain 110a having the leftward magnetization. On the other hand, the leak magnetic field having the vertically upward component is generated just over the boundary between the magnetic domain 110b having the rightward magnetization and the magnetic domain 110a having the leftward magnetization.

Figure 14B:
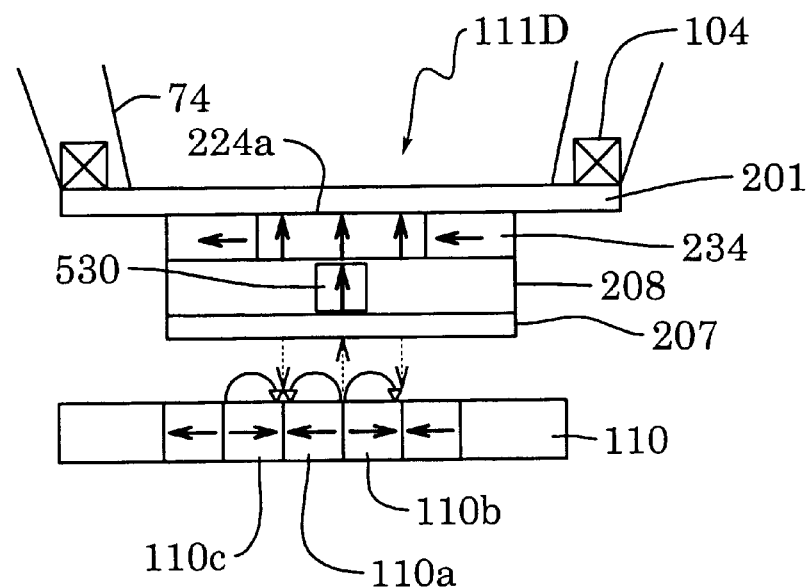
FIG. 14B shows a situation in which the magnetic slit is moved over an interface between magnetic domains 110a, 110b of the magnetic recording layer.

As shown in FIG. 14B, when the magnetic slit 530, which is formed in the thermal conductive reflective film 208 of the magnetic lens 111D, is moved to a position over the boundary between the magnetic domain 110b having the rightward magnetization and the magnetic domain 110a having the leftward magnetization, the magnetization of the magnetic slit 530 is directed upwardly in accordance with the upward leak magnetic field brought about by the magnetic domains 110b, 110a. The upward magnetization of the magnetic slit 530 is transferred to the reproducing layer 224 on the basis of the principle described in the fourth embodiment, and it is magnified in the area of the reproducing layer 224 in which the temperature exceeds the critical temperature. Thus, the magnified area 224a is formed in the reproducing layer 224. A reproduced signal is obtained by detecting the reflected light beam of the reproducing light beam 74 from the magnified area 224. As described above, the magnetic lens according to the embodiment of the present invention makes it possible to detect the information recorded on the magnetic disk as the magneto-optical signal.

The present invention has been explained with reference to the embodiments. However, the present invention is not limited thereto. For example, arbitrary dimensions and arbitrary materials can be selected for the magnetic slit and the reproducing layer for constructing the magnetic lens provided that the effect of the present invention is obtained. The magnetic lens of the present invention is not limited to the recording and reproduction on the magneto-optical recording medium and the magnetic recording medium having the magnetic recording layer, for which a variety of applications may be conceived, including, for example, those concerning the fields of the inspection of integrated circuits and microdevices, the analysis of metal pieces, rocks, and microorganisms, the analysis of living systems, the diagnosis of human bodies, and the medical treatment.

The reproducing element and the reproducing apparatus of the present invention can be applied with known improvement to allow them to have various functions including, for example, the information recording, the pulsation of the recording or reproducing external magnetic field, and the pulsation of the reproducing light beam. The information-recording medium to be used for the reproducing apparatus of the present invention may be also applied with known improvement to optimize it for the present invention. For the purpose of the improvement as described above, for example, the disclosures of WO98/09283, WO98/02877, WO98/02878, WO98/22969, WO97/03439, and the Unites States Patent applications or the United State Patents corresponding thereto are incorporated herein by reference.

The magnetic lens of the present invention makes it possible to distinguish the minute magnetic domain contained in an object from other adjoining magnetic domains contained in the same object so that the magnetization characteristic of the magnetic domain is magnified to make observation or detection. The magnetic lens of the present invention is extremely effective to observe or inspect the magnetic characteristic of every microdevice exhibiting magnetization which is being in the advancement of downsizing in accordance with the recent technical trend. When the magnetic reproducing element, the reproducing apparatus, and the reproducing method of the present invention are used, it is possible to perform the reproduction with the amplified signal intensity at high C/N while distinguishing the magnetization information of each magnetic domain from the magnetization information of the other magnetic domains without complicating the structure of the medium even in the case of the magnetic recording medium and the magneto-optical recording medium subjected to the high density recording or the super high density recording.

What is claimed is:

1. A magnetic reproducing element to be arranged closely to a recording medium, for performing reproduction on the recording medium including a magnetic recording layer recorded with information as a recording magnetic domain, the magnetic reproducing element comprising:

a magnetic transfer section composed of a magnetic material for transferring the recording magnetic domain thereto; and a reproducing section composed of a magnetic material and magnetically connected to the magnetic transfer section, the reproducing section having a width larger than the recording magnetic domain, wherein: a reproducing light beam is radiated onto the reproducing section when the information is reproduced, and the reproducing light beam is used to reproduce magnetization information transferred from the recording magnetic domain to the reproducing section via the magnetic transfer section.

2. The magnetic reproducing element according to claim 1, wherein when the reproducing section is irradiated with the light beam, then the magnetization information of the recording magnetic domain is transferred as a magnetic domain having a width larger than a width of the recording magnetic domain via the transfer section to the magnetic film of the reproducing section, and the transferred magnetization information is detected with the light beam on the basis of a magneto-optical effect.

3. The magnetic reproducing element according to claim 1, wherein the transfer section has a width which is not more than 0.2 $\mu$m.

4. The magnetic reproducing element according to claim 1, wherein the transfer section and the magnetic film are subjected to exchange coupling when the information is reproduced.

5. The magnetic reproducing element according to claim 1, further comprising a non-magnetic layer provided between the transfer section and the magnetic film, wherein the transfer section and the magnetic film are magnetostatically coupled via the non-magnetic layer when the information is reproduced.

6. The magnetic reproducing element according to claim 5, wherein the non-magnetic layer is a reflective layer for reflecting the reproducing light beam radiated onto the reproducing section.

7. The magnetic reproducing element according to claim 6, wherein a material, which has higher thermal conductivity than a material used to make the reflective layer, is embedded in a portion of the reflective layer opposing to the transfer section.

8. The magnetic reproducing element according to claim 1, wherein the magnetic film is a magnetic film which changes from an in-plane magnetizable film to a perpendicularly magnetizable film at a temperature above a predetermined critical temperature.

9. The magnetic reproducing element according to claim 1, wherein the magnetic reproducing element is arranged closely to the recording medium so that a leak magnetic field from the recording magnetic domain is detected to transfer the magnetization information of the recording magnetic domain to the transfer section.

10. The magnetic reproducing element according to claim 1, wherein the transfer section has a width which is not more than the recording magnetic domain.

11. A reproducing apparatus for performing reproduction on a recording medium including a magnetic recording layer recorded with information as a recording magnetic domain, the reproducing apparatus comprising:
an optical head for radiating a reproducing light beam onto the recording medium; and
a magnetic head for being arranged closely to the recording medium, wherein:
the magnetic head includes a magnetic transfer section composed of a magnetic material for transferring the recording magnetic domain thereto, and a reproducing section composed of a magnetic material and magnetically connected to the magnetic transfer section, the reproducing section having a width larger than the recording magnetic domain; and
the reproducing light beam is radiated from the optical head onto the reproducing section of the magnetic head when the information is reproduced, and the reproducing light beam is used to reproduce magnetization information transferred from the recording magnetic domain to the reproducing section via the magnetic transfer section.

12. The reproducing apparatus according to claim 11, further comprising a slider which floats over a surface of the recording medium in accordance with an aerodynamic action, wherein the magnetic head is provided in a through hole formed in the slider.

13. The reproducing apparatus according to claim 12, wherein a light-transmitting section is formed in the slider.

14. The reproducing apparatus according to claim 13, wherein tracking is performed for the recording medium by using the light beam passed through the light-transmitting section.

15. The reproducing apparatus according to claim 12, wherein a magnetic coil for applying a magnetic field to the recording medium is provided in the slider.

16. The reproducing apparatus according to claim 12, further comprising a first arm for supporting the optical head, and a second arm for floating and supporting the slider over the surface of the recording medium.

17. The reproducing apparatus according to claim 12, wherein the second arm is joined to the first arm.

18. The reproducing apparatus according to claim 11, wherein when the reproducing section is irradiated with the light beam, then the magnetization information of the recording magnetic domain is transferred as a magnetic domain having a width larger than a width of the recording magnetic domain via the magnetic transfer section to the magnetic film of the reproducing section, and the transferred magnetization information is detected with the light beam on the basis of a magneto-optical effect.

19. The reproducing apparatus according to claim 11, wherein the magnetic transfer section has a width which is not more than 0.2 $\mu$m.

20. The reproducing apparatus according to claim 11, wherein the transfer section and the magnetic film are subjected to exchange coupling when the information is reproduced.

21. The reproducing apparatus according to claim 11, further comprising a non-magnetic layer provided between the transfer section and the magnetic film, wherein the transfer section and the magnetic film are magnetostatically coupled via the non-magnetic layer when the information is reproduced.

22. The reproducing apparatus according to claim 11, wherein the magnetic film is a magnetic film which changes from an in-plane magnetizable film to a perpendicularly magnetizable film at a temperature above a predetermined critical temperature.

23. The reproducing apparatus according to claim 11, wherein the magnetic head is arranged closely to the recording medium so that a leak magnetic field from the recording magnetic domain is detected to transfer the magnetization information of the recording magnetic domain to the transfer section.

24. The reproducing apparatus according to claim 11, wherein the recording medium is a recording medium comprising at least a magneto-optical recording layer and a substrate, and the recording medium is installed into the reproducing apparatus so that the magneto-optical recording layer is disposed at a position nearer to the magnetic head than the substrate.

25. The reproducing apparatus according to claim 11, wherein the transfer section has a size which is not more than that of the recording magnetic domain.

26. The reproducing apparatus according to claim 11, wherein the transfer section is composed of permalloy.

27. The reproducing apparatus according to claim 11, further comprising a magnetic film disposed on a side of the transfer section or the reproducing layer.

28. A reproducing method for performing reproduction on a recording medium including a magnetic recording layer recorded with information as a recording magnetic domain, the reproducing method comprising the steps of:
providing a magnetic reproducing element comprising a magnetic transfer section composed of a magnetic material for transferring the recording magnetic domain thereto, and a reproducing section composed of a magnetic material and magnetically connected to the magnetic transfer section, the reproducing section having a width larger than the recording magnetic domain;
arranging, upon the reproduction of the information, the magnetic reproducing element closely to the recording medium so that magnetization information on the recording magnetic domain is transferred to the magnetic transfer section of the magnetic reproducing element by the aid of a leak magnetic field from the recording magnetic domain in the recording medium; and
radiating a reproducing light beam onto the reproducing section of the magnetic reproducing element to reproduce the magnetization information transferred from the recording magnetic domain to the reproducing section via the magnetic transfer section on the basis of a magneto-optical effect.

29. The reproducing method according to claim 28, wherein the reproducing light beam is a continuous light beam or a pulse light beam.

30. The reproducing method according to claim 28, wherein a reproducing magnetic field is applied when the information is reproduced.

31. The reproducing method according to claim 28, wherein the recording medium is a magneto-optical recording medium comprising at least a magneto-optical recording layer as the magnetic recording layer and a substrate, and the recording medium is arranged so that the magneto-optical recording layer is disposed nearer to the magnetic reproducing element than the substrate.

32. The reproducing method according to claim 31, wherein the reproducing light beam is not required to be radiated onto the magneto-optical recording medium when the information is reproduced.

33. The reproducing method according to claim 31, wherein the transfer section is composed of permalloy.

34. The reproducing method according to claim 31, wherein the transfer section has a size which is smaller than that of the recording magnetic domain.

* * * * *